(12) United States Patent
Fujii

(10) Patent No.: US 9,685,998 B2
(45) Date of Patent: Jun. 20, 2017

(54) APPARATUS AND METHOD FOR CONTROLLING ORIENTATION

(71) Applicant: Samsung Electronics Co., Ltd, Suwon-si (KR)

(72) Inventor: Masaaki Fujii, Yokohama (JP)

(73) Assignee: Samsung Electronics Co., Ltd, Suwon-si (KR)

( * ) Notice: Subject to any disclaimer, the term of this patent is extended or adjusted under 35 U.S.C. 154(b) by 0 days.

(21) Appl. No.: 14/898,075

(22) PCT Filed: Jul. 2, 2014

(86) PCT No.: PCT/KR2014/005879
§ 371 (c)(1),
(2) Date: Dec. 11, 2015

(87) PCT Pub. No.: WO2015/002448
PCT Pub. Date: Jan. 8, 2015

(65) Prior Publication Data
US 2016/0156391 A1    Jun. 2, 2016

(30) Foreign Application Priority Data

Jul. 2, 2013 (JP) .................................. 2013-138857
Jul. 1, 2014 (KR) ......................... 10-2014-0081870

(51) Int. Cl.
H04B 1/00 (2006.01)
H04B 7/04 (2017.01)
(Continued)

(52) U.S. Cl.
CPC ............. *H04B 7/04* (2013.01); *H04B 7/0617* (2013.01); *H04B 7/0842* (2013.01); *H04L 25/021* (2013.01); *H04L 25/0202* (2013.01)

(58) Field of Classification Search
CPC ........................................................ H04B 7/04
(Continued)

(56) References Cited

U.S. PATENT DOCUMENTS 6,075,484 A * 6/2000 Daniel ...................... G01S 3/06
                                                               342/372
7,817,967 B2    10/2010 Karabinis et al.
(Continued)

FOREIGN PATENT DOCUMENTS

EP          1843487 A1   10/2007
JP       2002543436 A    12/2002
(Continued)

OTHER PUBLICATIONS

International Search Report dated Oct. 10, 2014 in connection with International Patent Application No. PCT/KR2014/005879, 3 pages.
(Continued)

*Primary Examiner* — April G Gonzales

(57) ABSTRACT

An orientation control apparatus and a method thereof are provided. The orientation control apparatus for controlling orientation of a phased array antenna includes the phased array antenna and an orientation controller. In the phased array antenna, a plurality of antenna elements are disposed on a plane. The phased array antenna receives a signal transmitted from at least one transmitter. The orientation controller controls orientation of the phased array antenna based on a channel estimated result of each sub array where the plurality of antenna elements have been grouped in the phased array antenna.

14 Claims, 12 Drawing Sheets

(51) Int. Cl.
*H04L 25/02* (2006.01)
*H04B 7/06* (2006.01)
*H04B 7/08* (2006.01)

(58) Field of Classification Search
USPC ........................................................ 455/63.4
See application file for complete search history.

(56) References Cited

U.S. PATENT DOCUMENTS

| | | | | |
|---|---|---|---|---|
| 2007/0293269 | A1* | 12/2007 | Kuwahara | H01Q 1/246 |
| | | | | 455/562.1 |
| 2008/0075190 | A1* | 3/2008 | Lin | H04B 7/04 |
| | | | | 375/267 |
| 2010/0035600 | A1* | 2/2010 | Hou | H04B 7/024 |
| | | | | 455/422.1 |
| 2010/0117890 | A1* | 5/2010 | Vook | H04B 17/21 |
| | | | | 342/174 |
| 2011/0090813 | A1* | 4/2011 | Kisigami | G01S 3/74 |
| | | | | 370/252 |
| 2013/0057432 | A1 | 3/2013 | Rajagopal et al. | |

FOREIGN PATENT DOCUMENTS

| | | |
|---|---|---|
| JP | 2008205645 A | 9/2008 |
| JP | 2010212877 A | 9/2010 |

OTHER PUBLICATIONS

Written Opinion of International Searching Authority dated Oct. 10, 2014 in connection with International Patent Application No. PCT/KR2014/005879, 4 pages.

\* cited by examiner

APPARATUS AND METHOD FOR CONTROLLING ORIENTATION

CROSS-REFERENCE TO RELATED APPLICATION(S)

The present application claims priority under 35 U.S.C. §365 to International Patent Application No. PCT/KR2014/005879 filed Jul. 2, 2014, entitled "APPARATUS AND METHOD FOR CONTROLLING ORIENTATION", and through International Patent Application No. PCT/KR2014/005879 to Japan Patent Application No. 2013-138857 filed Jul. 2, 2013, and Korean Patent Application No. 10-2014-0081870 filed Jul. 1, 2014, each of which are incorporated herein by reference into the present disclosure as if fully set forth herein.

TECHNICAL FIELD

The present invention relates to an apparatus and a method for controlling orientation.

BACKGROUND ART

Recently, a study or technology development for improving transmission speed in a mobile communication scheme is in an active progress. For example, a method for using a wideband signal in order to improve a transmission speed in a mobile communication scheme exists. Here, to transmit a wideband signal faster, a submillimeter wave of a frequency higher than a microwave that is being used up to now needs to be used. However, in case of using a signal of a high carrier frequency, an electric energy loss increases. Therefore, in case of using a signal of a high carrier frequency, a service area that may provide a mobile communication service reduces or an electric energy loss increases remarkably.

Accordingly, as a compensation technology for compensating for an electric energy loss, an antenna array technology that secures circuit quality by means of an array gain draws an attention. As an antenna array technology, a technology disclosed in Japanese Patent Publication No. 2008-205645 exists.

To obtain a larger array gain, a large number of antenna elements (referred to as an 'array device' hereinafter) compared to the conventional phased array antenna for reception of a microwave is required. However, in case of having a frequency converter and an Analog-to-Digital Converter (ADC) in each array device and performing a signal reproduction process or an orientation (phase) control process based on a reception signal received by each array device, a circuit scale or a device scale regarding signal processing of a received signal increases.

In this case, it may be possible to reduce a circuit scale or a device scale by performing synthesis of a received signal received by each array device using an analog circuit that processes an intermediate frequency signal. However, in case of performing synthesis of a received signal received by each array device using an analog circuit that processes an intermediate frequency signal, a method of a higher function (for example, a method of a higher accuracy) cannot be used in a process regarding signal detection or an orientation control process, etc. Therefore, in case of performing synthesis of a received signal received by each array device using an analog circuit that processes an intermediate frequency signal, it is difficult to optimally adjust a direction in which a transmitter that transmits an orientation signal is positioned, or achieve a high signal detection characteristic when a direction in which the transmitter is positioned and a beam direction are dislocated.

As a method for solving this problem, like a technology described in Japanese Patent Publication No. 2008-205645, a method for grouping a plurality of array devices forming a phased array antenna, performing synthesis of a received signal received by each array device in each sub array where array devices have been grouped to carry out a signal reproduction process or an orientation control process. In case of performing synthesis of a received signal received by each array device in each sub array to carry out a signal reproduction process or an orientation control process, a circuit scale or a device scale may be made smaller than a case of preparing a frequency converter or an A/D converter in each array device, and a method of a higher function may be used.

For example, in the technology described in Japanese Patent Publication No. 2008-205645, a communication unit performing an orientation control process corrects an amplitude or a phase based on an already known reference transmission signal (for example, a signal corresponding to a trading signal) transmitted from a transmitter. However, since the technology described in Japanese Patent Publication No. 2008-205645 corrects an amplitude or a phase based on a reference transmission signal corresponding to a training signal, it is not considered that it may pursue accuracy improvement of an orientation control for a signal representing real data such as user data, etc.

DISCLOSURE OF INVENTION

Solution to Problem

An aspect of the present invention is to address at least the above-mentioned problems and/or disadvantages and to provide at least the advantages described below. Accordingly, an aspect of the present invention is to provide an apparatus and a method for controlling orientation, having novelty and an improved characteristic, capable of improving an accuracy of an orientation control while suppressing an increase in a circuit scale regarding signal processing of a signal received by a phased array antenna.

In accordance with an aspect of the present invention, an orientation control apparatus for controlling orientation of a phased array antenna is provided. The apparatus includes the phased array antenna where a plurality of antenna elements are disposed on a plane, and which receives a signal transmitted from at least one transmitter, and an orientation controller for controlling orientation of the phased array antenna based on a channel estimated result of each sub array where the plurality of antenna elements have been grouped in the phased array antenna.

In accordance with another aspect of the present invention, a method for controlling orientation of a phased array antenna in an orientation control apparatus is provided. The method includes receiving a signal transmitted from at least one transmitter using the phased array antenna where a plurality of antenna elements are disposed on a plane, and controlling orientation of the phased array antenna based on a channel estimated result of each sub array where the plurality of antenna elements have been grouped in the phased array antenna.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF DRAWINGS

The above and other aspects, features and advantages of certain exemplary embodiments of the present invention will be more apparent from the following description taken in conjunction with the accompanying drawings in which.

Throughout the drawings, like reference numerals will be understood to refer to like parts, components and structures.

BEST MODE FOR CARRYING OUT THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Also, descriptions of well-known functions and constructions are omitted for clarity and conciseness. The terms and words used in the following description and claims are not limited to the bibliographical meanings, but, are merely used by the inventor to enable a clear and consistent understanding of the invention.

An orientation control apparatus described below is a communication unit having a communication function (for example, an apparatus having a phased array antenna and a receiver for processing a received signal). A case where a phased array antenna provided to the communication unit controls orientation is exemplarily described. Therefore, hereinafter, an orientation control apparatus according to an embodiment of the present invention is denoted by a 'communication unit', and a proper embodiment of the present invention is described.

In addition, the function of an orientation control apparatus according to an embodiment of the present invention is not limited to a communication function. For example, in an orientation control apparatus according to an embodiment of the present invention, an external communication unit having a phased array antenna may control orientation of the phased array antenna.

<A Problem of a Communication Unit in the Conventional Art>

Before describing the construction of a communication unit (referred to as an 'orientation control apparatus', hereinafter) according to an embodiment of the present invention, a problem of the conventional communication unit is described first.

[A] A Problem of a Conventional First Communication Unit

Figure 1:
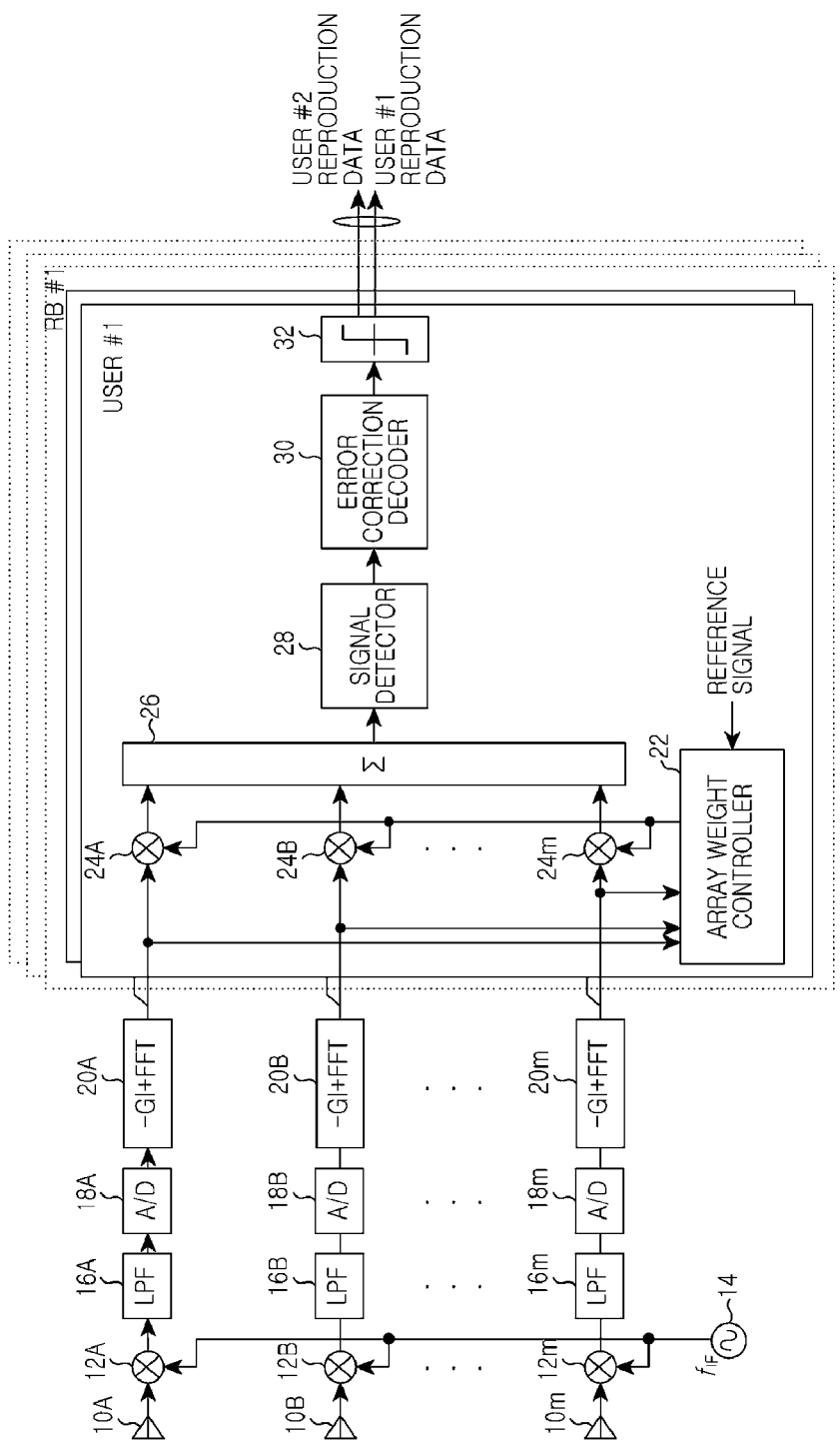
FIG. 1 is a block diagram illustrating a first communication apparatus according to the conventional art.

FIG. 1 is a block diagram illustrating a first communication apparatus according to the conventional art.

Referring to FIG. 1, FIG. 1 illustrates a block diagram of the conventional communication unit where a frequency converter, a low pass filter, and an A/D converter are provided to each of antenna elements forming a phased array antenna. In addition, FIG. 1 illustrates a construction related to digital beamforming among the construction of the conventional communication unit.

For example, a conventional first communication unit includes antenna elements 10A, 10B, . . . , 10m, multipliers 12A, 12B, . . . , 12m, an oscillation circuit 14 for generating a signal of an intermediate frequency (IF), low pass filters 16A, 16B, . . . , 16m, A/D converters 18A, 18B, . . . , 18m, Fast Fourier Transform (FFT) circuits 20A, 20B, . . . , 20m, an array weight controller 22, multipliers 24A, 24B, . . . , 24m, a synthesis circuit 26, a signal detector 28, an error correction decoder 30, and a decision circuit 32.

A signal received by the antenna elements 10A, 10B, . . . , 10m (each array) is converted to an intermediate frequency by the multipliers 12A, 12B, . . . , 12m. That is, each of the multipliers 12A, 12B, . . . , 12m serves as a role of a frequency converter.

A signal frequency-converted by the multipliers 12A, 12B, . . . , 12m is filtered by the low pass filters 16A, 16B, . . . , 16m, and then sampled by the A/D converters 18A, 18B, . . . , 18m. That is, each of the low pass filters 16A, 16B, . . . , 16m performs a role of a filtering circuit, and each of the A/D converters 18A, 18B, . . . , 18m performs a role of a sampling circuit. As a signal is sampled by the A/D converters 18A, 18B, . . . , 18m, subsequent processes at the conventional first communication unit become processes for a digital signal.

The FFT circuits 20A, 20B, . . . , 20m convert a signal to a signal in a frequency domain by removing a Guard Interval (GI) from a sampled signal, and performing FFT.

The array weight controller 22 calculates an array weight vector. Here, since a signal in the frequency domain, that is, a reference signal included in a reception baseband signal is a signal known in advance in the conventional first communication unit, the array weight controller 22 calculates an array weight vector so that the signal in the frequency domain may become a desired signal.

The multipliers 24A, 24B, . . . , 24m multiply a signal in the frequency domain transferred from the FFT circuits 20A, 20B, . . . , 20m and the array weight vector. The synthesis circuit 26 synthesizes a signal transferred from the multipliers 24A, 24B, . . . , 24m. The signal detector 28 detects a signal transmitted from a transmitter (for example, User Equipment carried by a user) from a signal transferred from the synthesis circuit 26. A product operation of an array weight vector and a reception digital symbol is performed at the multipliers 24A, 24B, . . . , 24m and the synthesis circuit 26, and a signal transmitted from the transmitter is detected by the signal detector 28, so that a signal transmitted from the transmitter is recovered.

The error correction decoder 30 corrects an error of a signal detected by the signal detector 28, and the decision circuit 32 determines "0" and "1" of an error-corrected signal (digital signal), and outputs a signal (digital signal) representing the decision result as reproduction data (reception data) corresponding to a signal transmitted from the transmitter.

For example, the conventional first communication unit illustrated in FIG. 1 performs an adaptive array control (control of an amplitude and a phase) by collectively performing a digital signal process on signals received from all antenna elements. In this case, the conventional first communication unit controls an amplitude and a phase using an adaptation algorithm or an inverse matrix operation so that an error of a signal in the frequency domain transferred from the FFT circuits 20A, 20B, . . . , 20m and a reference signal (a training signal).

However, as illustrated in FIG. 1, the conventional first communication unit should have a multiplier (frequency converter), a low pass filter, and an A/D converter in each of antenna elements forming a phased array antenna. Therefore, in the conventional first communication unit, as the number of antenna elements forming the phased array antenna increases (that is, the number of required array devices increases), a circuit scale by signal processing of a signal received by the phased array antenna increases rapidly.

[B] A Problem of a Conventional Second Communication Unit

Figure 2:
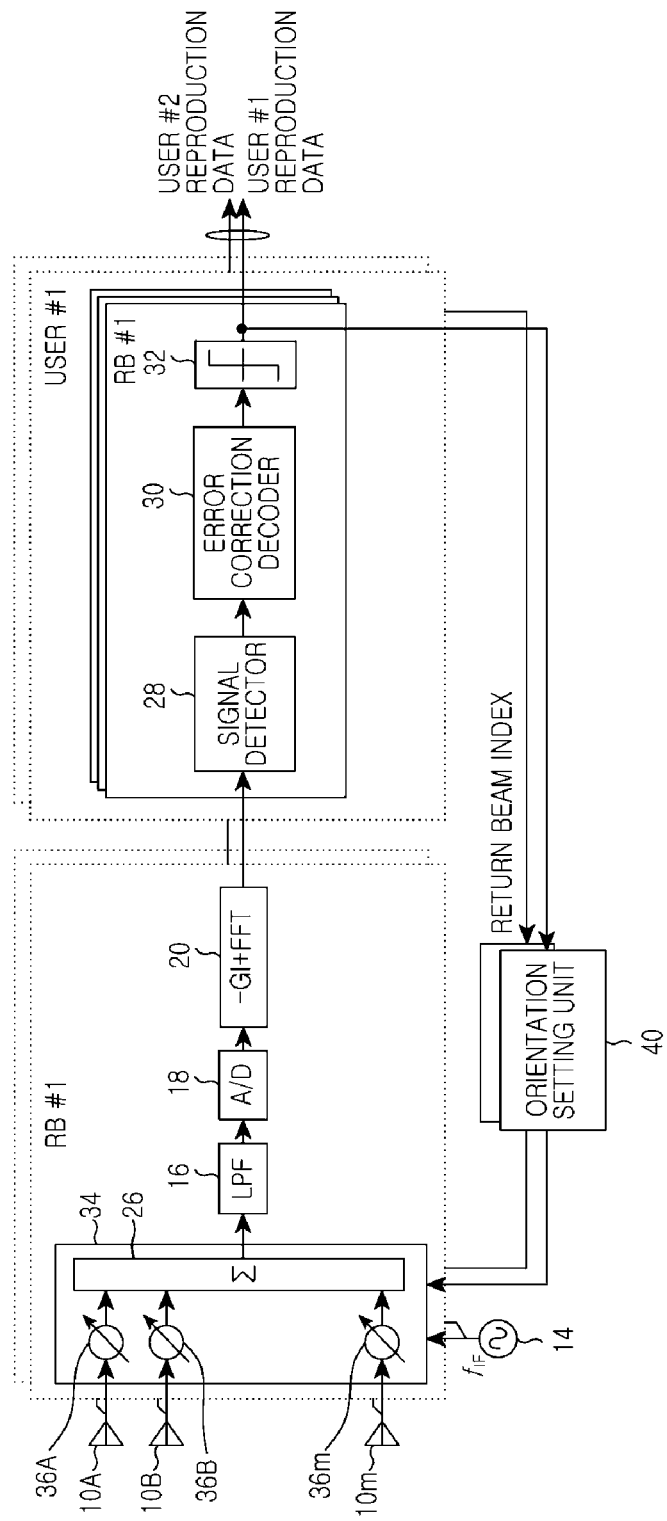
FIG. 2 is a block diagram illustrating a second communication apparatus according to the conventional art.

FIG. 2 is a block diagram illustrating a second communication apparatus according to the conventional art.

Referring to FIG. 2, FIG. 2 illustrates a block diagram of a communication unit where an oscillation circuit for generating a signal of an intermediate frequency frequency-converts a generated signal and then synthesizes so that it is suitable for a phase corresponding to orientation desired by each of devices forming the phased array antenna, and filtering and sampling are performed by a group of filter circuits and sampling circuits. In addition, FIG. 2 illustrates a construction related to digital beamforming among the construction of the conventional communication unit.

For example, the conventional second communication unit includes antenna elements 10A, 10B, . . . , 10m, a signal converter 34, an oscillation circuit 14, a low pass filter 16, an A/D converter 18, an FFT circuit 20, a signal detector 28, an error correction decoder 30, a decision circuit 32, and an orientation setting unit 40. Also, the signal converter 34 includes frequency converters 36A, 36B, . . . , 36m corresponding to antenna elements 10A, 10B, . . . , 10m, respectively, and a synthesis circuit 26.

A signal received in the antenna elements 10A, 10B, . . . , 10m (each array) is frequency-converted in the frequency converters 36A, 36B, . . . , 36m. In addition, the synthesis circuit 26 synthesizes a signal frequency-converted in the frequency converters 36A, 36B, . . . , 36m. Here, the frequency converters 36A, 36B, . . . , 36m converts a signal received in the antenna elements 10A, 10B, . . . , 10m from a radio frequency to an intermediate frequency, and converts the signal to a baseband signal (a signal before converted and conveyed on a carrier). Also, when converting a signal to a baseband signal, the frequency converters 36A, 36B, . . . , 36m frequency-converts a signal generated by the oscillation circuit 14 so that the signal is suitable for a phase corresponding to orientation desired by each of the antenna elements. At this point, desired orientation is set by the orientation setting unit 40.

As described in the frequency converters 36A, 36B, . . . , 36m, after a signal is frequency-converted, as the synthesis circuit 26 synthesizes a signal, when signals received in the antenna elements 10A, 10B, . . . , 10m (each array) are converted to baseband signals, beamforming is performed. Therefore, the conventional second communication unit has an advantage that the conventional second communication unit may have one set of a low pass filter 16, an A/D converter 18, and an FFT circuit 20 at the end of the signal converter 34 as illustrated in FIG. 2.

A signal output from the synthesis circuit 26 is filtered by the low pass filter 16, and then sampled by the A/D converter 18. That is, the low pass filter 16 performs a role of a filtering circuit, and the A/D converter 18 performs a role of a sampling circuit. As a signal is sampled by the A/D converter 18, subsequent processes at the conventional second communication unit become processes for a digital signal.

The FFT circuit 20 converts a signal to a signal in the frequency domain by removing a Guard Interval (GI) from a sampled signal and performing the FFT.

The signal detector 28 detects a signal transmitted by a transmitter from a signal transferred from the FFT circuit 20. The error correction decoder 30 corrects an error of a signal detected by the signal detector 28, and the decision circuit 32 determines "0" and "1" of an error-corrected signal (digital signal), and outputs a signal (digital signal) representing the decision result as reproduction data (reception data) corresponding to a signal transmitted from the transmitter.

The orientation setting unit 40 sets orientation based on feedback of an optimized beam index among a plurality of fixed beams transmitted from a transmitter included in reproduction data.

For example, an orientation (phase) control in the conventional second communication apparatus illustrated in FIG. 2 is switched in a quantized direction based on a fed-back beam index.

In addition, as illustrated in FIG. 2, the conventional second communication unit may have a plurality of beamforming portions including the signal converter 34, the low pass filter 16, the A/D converter 18, and the FFT circuit 20 to allow each of the antenna elements 10A, 10B, . . . , 10m to process a signal received in each beamforming portion, thereby simultaneously receiving signals transmitted by a plurality of transmitters.

However, as illustrated in FIG. 2, the block configuration of the conventional second communication unit is simpler than that of the conventional first communication unit. Therefore, using, at the conventional second communication unit, a method of a higher function (for example, a method of a higher accuracy) in a process by signal detection or an orientation control process, etc. is limited. Therefore, it is difficult that the conventional second communication unit optimally adjusts orientation to a direction where a transmitter is positioned, or has a higher signal detection characteristic when a direction in which the transmitter is positioned and a beam direction are dislocated.

As described with reference to FIGS. 1 and 2, the conventional communication unit has a problem that a scale of a circuit for processing a signal received by a phased array antenna increases rapidly or a problem of having a high signal detection characteristic.

<A Communication Unit (Orientation Control Apparatus) According to an Embodiment of the Present Invention>

Subsequently, a communication unit according to an embodiment of the present invention is described.

Figure 3:
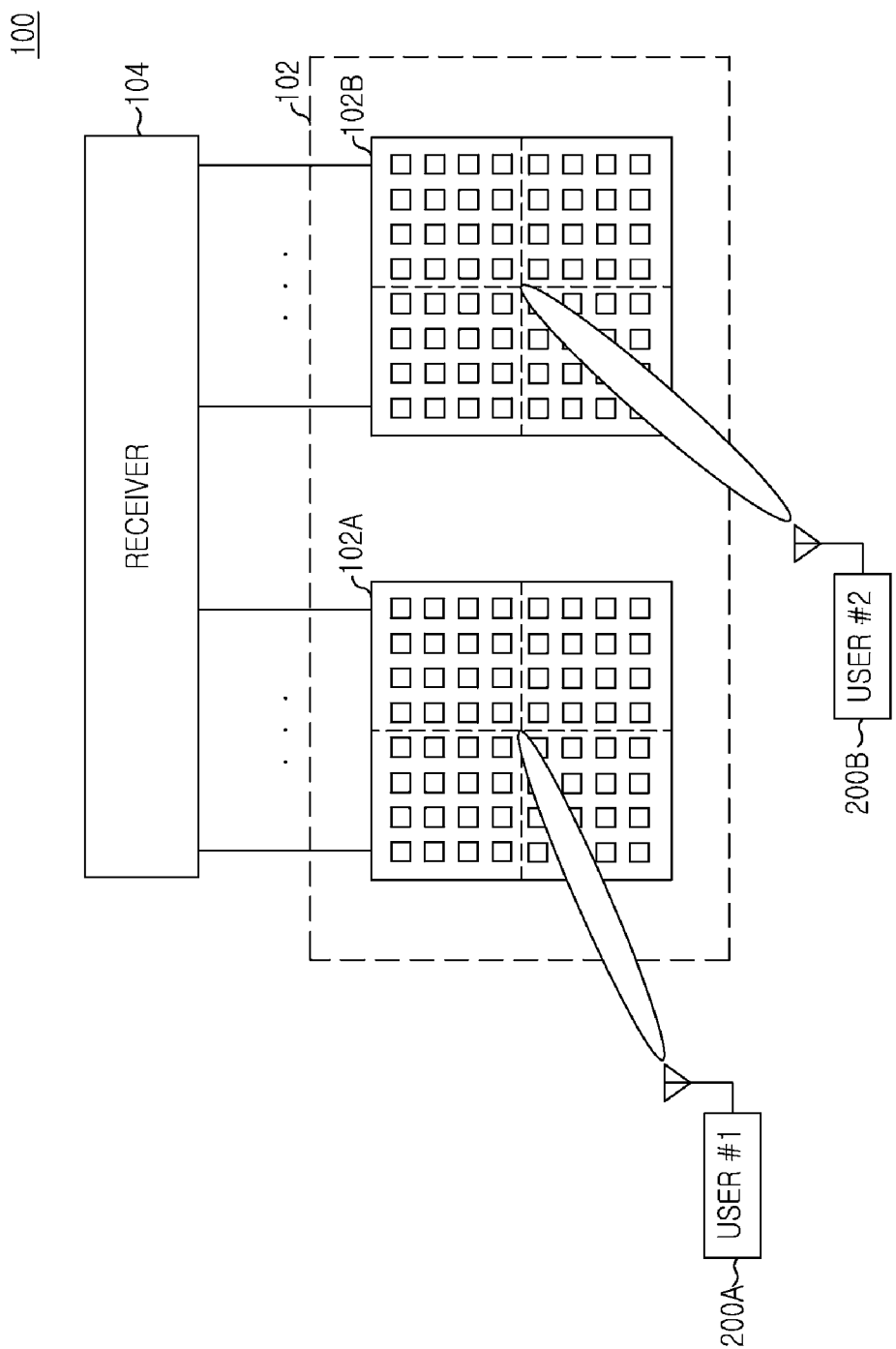
FIG. 3 is a view illustrating a system having a communication unit according to an embodiment of the present invention.

[1] The Summary of a Communication System Including a Communication Unit According to an Embodiment of the Present Invention FIG. 3 is a view illustrating a system having a communication unit according to an embodiment of the present invention.

In FIG. 3, the summary of a communication unit and a transmitter forming a communication system according to an embodiment of the present invention is described.

The communication system according to an embodiment of the present invention includes a communication unit 100 and transmitters 200A and 200B.

Referring to FIG. 3, an example where the communication unit 100 receives signals transmitted from the transmitter 200A and the transmitter 200B, respectively, (referred to as a 'transmitter 200' or a 'user' in general, hereinafter) which are two transmitters is illustrated. In addition, signals received by the communication unit 100 according to an embodiment of the present invention are not limited to signals transmitted from the two transmitters 200A and 200B, respectively. For example, the communication unit 100 according to an embodiment of the present invention may receive signals transmitted from one or more transmitters, respectively, and process the received signals.

Hereinafter, the transmitter 200A is denoted by a 'user 1' for convenience in description, and a signal transmitted from the transmitter 200A may be also denoted by a 'user 1'. Likewise, the transmitter 200B may be denoted by a 'user 2', and a signal transmitted from the transmitter 200B may be also denoted by a 'user 2'.

In addition, referring to FIG. 3, an example (example of space diversity arrangement) where a plurality of antenna elements of the communication unit 100 have two phased array antennas disposed on a plane, and the phased array antennas are separated apart with an interval of about 10~20 wavelength. For example, as illustrated in FIG. 3, assuming that the number of phased array antennas is 2, it is possible that a plurality of users access the communication unit 100 simultaneously (a plurality of users perform communication with the communication unit 100 simultaneously) by allowing respective phased array antennas to correspond to different users.

In addition, the number of phased array antennas that may be included in the communication unit 100 according to the embodiment of the present invention is not limited to two. For example, the communication unit 100 according to the embodiment of the present invention may include one or more phased array antennas. Even in the case where the communication unit 100 according to the embodiment of the present invention includes one or more phased array antennas, a plurality of users may access the communication unit 100 simultaneously. Hereinafter, description is made using an example where the communication unit 100 according to the embodiment of the present invention includes two or more phased array antennas.

[1-1] The Summary of a Communication Unit According to an Embodiment of the Present Invention The communication unit 100 may include a phased array antenna 102 and a receiver 104.

In addition, the communication unit 100 may include a controller (not shown), Read Only Memory (ROM) (not shown), Random Access Memory (RAM) (not shown), and another communication unit for performing communication with at least one of external devices. The communication unit 100 may connect between the described respective elements via a bus which is a transmission line of data.

Here, the controller (not shown) may include a Central Processing Unit (CPU) or various processing circuits, etc., and control the entire communication unit 100. In addition, the controller (not shown) may also perform a role of the receiver 104. Also, the receiver 104 may be configured using a dedicated (or universal) processing circuit.

ROM (not shown) may store a program used by the controller (not shown) or data for control such as an operation parameter, etc. RAM (not shown) may temporarily store a program, etc. executed by the controller (not shown).

Another communication unit (not shown) is another communication means included in the communication unit 100, and may perform communication with an external device via a wired line or wirelessly via a network (or directly). Here, another communication unit (not shown) may include at least one of an IEEE 802.11 port, a transmission/reception circuit (wireless communication), an optical connector to which an optical fiber is connected, an optical Integrated Circuit (IC), a Local Area Network (LAN) terminal, and a transmission/reception circuit (wired communication). In addition, a network according to an embodiment of the present invention may include a wired network such as a LAN or a Wide Area Network (WAN), etc., a wireless network such as a Wireless Local Area Network (WLAN) or a Wireless Wide Area Network (WWAN), etc., the Internet that uses a communication protocol such as Transmission Control Protocol/Internet Protocol (TCP/IP), etc.

The phased array antenna 102 may include a phased array antenna 102A and a phased array antenna 102B which are two phased array antennas. Each of the phased array antenna 102A and the phased array antenna 102B which are two phased array antennas may include a plurality antenna elements disposed on a plane, and receive a signal transmitted from one or more transmitters. Here, each of the phased array antenna 102A and the phased array antenna 102B may form a two-dimensional antenna array as illustrated in FIG. 3. In addition, as described above, the phased array antenna according to an embodiment of the present invention may include one or more phased array antennas.

The receiver 104 may process a signal received by each antenna element of the phased array antenna 102. For example, in the case where the communication unit 100 according to an embodiment of the present invention includes a plurality of phased array antennas, the receiver 104 may collectively process signals received by respective antenna elements of the plurality of phased array antennas.

Also, in the case where the communication unit 100 according to an embodiment of the present invention includes a plurality of phased array antennas, the receiver 104 may include a construction (for example, a construction including a plurality of sets that process signals received by respective antenna elements of each phased array antenna) for processing signals received by respective antenna elements of each phased array antenna.

The communication unit 100 may receive signals transmitted by the transmitters 200, respectively, at the same time or different times, and reproduce a signal transmitted from each transmitter 200. Therefore, to obtain better reception signal quality by allowing orientation to appear with respect to the respective transmitters 200, it is needed to set to allow orientation to appear to the direction of the transmitter 200 under a predictable environment (for example, an environment where no obstacle exists between the communication unit 100 and the transmitter 200), and to set to allow orientation to appear to the approaching direction of radio waves under an unpredictable environment (for example, an environment where an obstacle exists between the communication unit 100 and the transmitter 200).

Figure 4:
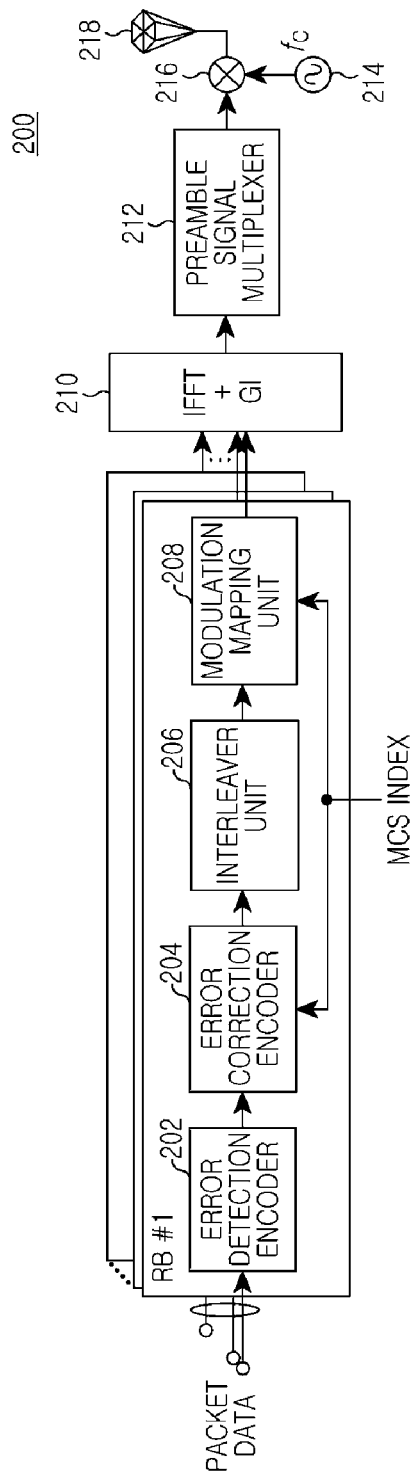
FIG. 4 is a block diagram illustrating a transmitter according to an embodiment of the present invention.

[1-2] The Summary of a Transmitter According to an Embodiment of the Present Invention FIG. 4 is a block diagram illustrating a transmitter according to an embodiment of the present invention. Here, FIG. 4 illustrates an example of a construction of signal transmission among the construction of the transmitter 200.

The transmitter 200 may include an error detection encoder 202, an error correction encoder 204, an interleaver unit 206, a modulation mapping unit 208, an Inverse Fast Fourier Transform (IFFT) unit 210, a preamble signal multiplexer 212, an oscillation circuit 214 for generating a signal of a frequency fc, a multiplier 216, and an antenna 218. Each Resource Block (referred to as a 'RB', hereinafter) for processing packet data of a transmission object may include an error detection encoder 202, an error correction encoder 204, an interleaver 206, and a modulation mapping unit 208.

The error detection encoder 202 may add a code for error detection such as a Cyclic Redundancy Check (CRC) code, etc. to packet data of a transmission object.

The error correction encoder 204 may add a turbo code or a code for error correction such as a Low-Density Parity-Check (LDPC) code, etc. to packet data transferred from the error detection encoder 202. Also, the interleaver 206 may perform interleaving on packet data transferred from the error correction encoder 204, and the modulation mapping unit 208 may modulate and map packet data interleaved by the interleaver unit 206. Here, an encoding rate used in the error correction encoder 204 and a degree of modulation used in the modulation mapping unit 208 may be designated as a Modulation and Coding Set (MCS) index by the communication unit 100 or a base station, etc. depending on a channel circumstance of each resource block.

The IFFT unit 210 may convert packet data transferred from the modulating mapping unit 208 to a signal in a time domain by performing IFFT, and add a Guard Interval (GI). Here, the process at the IFFT unit 210 corresponds to a process for generating a signal corresponding to a "data signal portion" which will be described later.

The preamble signal multiplexer 212 may generate a signal (referred to as a 'preamble signal' hereinafter) transmitted from the transmitter 200. A preamble signal according to an embodiment of the present invention may be used for signal detection or orientation control at the communication unit 100.

Figure 5:
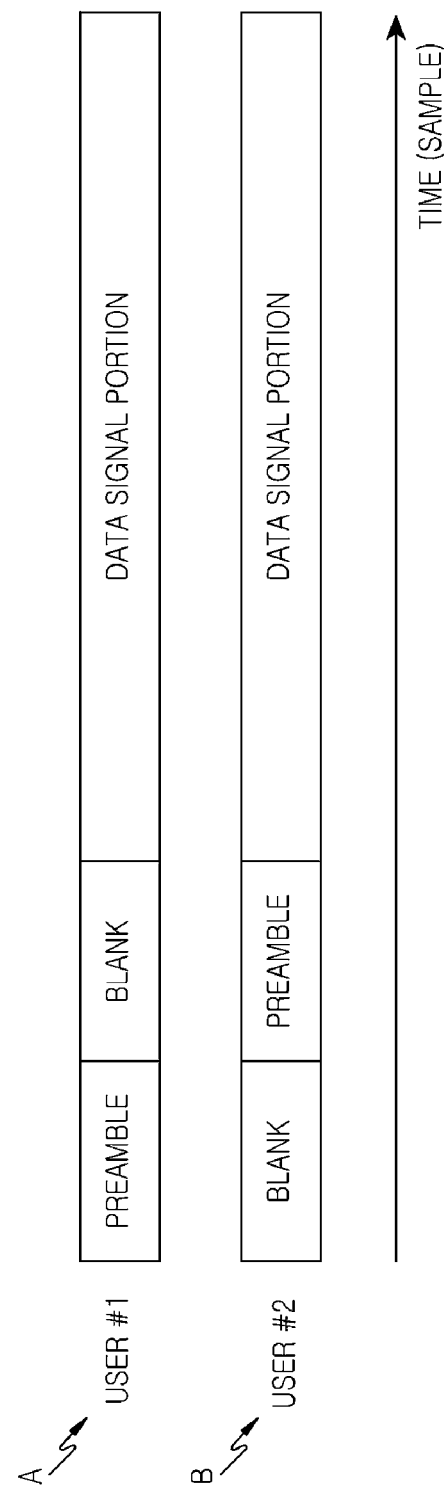
FIG. 5 is a view illustrating a structure of a signal transmitted from another transmitter according to an embodiment of the present invention.

FIG. 5 is a view illustrating a structure of a signal transmitted from another transmitter according to an embodiment of the present invention. A illustrated in FIG. 5 represents an example of a preamble signal transmitted from a transmitter 200A (user 1), and B illustrates an example of a preamble signal transmitted from a transmitter 200B (user 2).

In a communication system according to an embodiment of the present invention, a preamble signal that may be used for orientation control may be multiplexed in time division between users.

For example, as illustrated in FIG. 5, a preamble signal is multiplexed in time division between users, so that interference of a preamble signal between users may be avoided. Also, as illustrated in FIG. 5, with respect to a "data signal portion" (for example, a signal generated at the IFFT unit 210), interference may occur between users. The receiver 104 of the communication unit 100 may perform signal detection at a data section using a user detector.

As a method for multiplexing a preamble signal in time division between users in a communication system according to an embodiment of the present invention, there may exist a "method for adding, at the preamble signal multiplexer 212, a preamble portion in a timing different from a timing represented by a relevant signal based on a signal transmitted from an external device, that is, the signal representing the timing at which a relevant external device adds a preamble portion. Also, the preamble signal multiplexer 212 may transmit a signal representing a timing at which the transmitter 200 adds a preamble portion to a communication unit (not shown) which the transmitter 200 has in order to perform communication with an external device, or an external communication device connected to the transmitter 200.

In addition, the method for multiplexing a preamble signal in time division between users in the communication system according to the embodiment of the present invention is not limited thereto. A communication system according to an embodiment of the present invention may multiplex a preamble signal in time division between users using an arbitrary method that may multiplex a preamble signal in time division between users.

Also, a structure of a preamble signal transmitted from the transmitter 200 according to an embodiment of the present invention is not limited to that illustrated in FIG. 5. For example, a preamble signal according to an embodiment of the present invention may include a plurality of blank portions. In the case where a preamble signal includes a plurality of blank portions, a blank portion and a preamble portion are combined, so that one or more preamble signals may be multiplexed in time division between users.

Here, in the case where a plurality of users (transmitters 200) access the communication unit 100 simultaneously, interference may occur between signals transmitted from respective users, so that an error in the orientation control of the communication unit 100 may occur. However, as illustrated in FIG. 5, a preamble signal may be multiplexed in time division between users at the transmitter 200 of the communication system according to an embodiment of the present invention. Also, the communication unit 100 of the communication system according to an embodiment of the present invention may perform detection of signals corresponding to users, respectively, in a data section.

Therefore, even when a plurality of users access the communication unit 100 simultaneously, the communication unit 100 may make an error in an orientation control small, so that better reception signal quality may be obtained. Also, the communication unit 100 may raise even more possibility that may normally process a signal transmitted from each user.

Referring to FIG. 4 again, an example of the construction of the transmitter 200 is described.

A preamble signal output from the preamble signal multiplexer 212 is modulated at the multiplier 216 and transmitted to the direction from an antenna 218 to the communication unit 100. Here, the transmitter 200 may transmit a signal to the direction of the communication unit 100 using a sector antenna or transmission beamforming, etc.

The transmitter 200 may transmit a signal to the communication unit 100.

[2] The Construction of a Communication Unit According to an Embodiment of the Present Invention Next, the construction of the communication unit 100 according to an embodiment of the present invention is described in more specifically. Hereinafter, the construction of the communication unit 100 is described using an example where the communication unit 100 receives signals transmitted from the transmitter 200A and the transmitter 200B which are the two transmitters illustrated in FIG. 3. Also, hereinafter, the construction of the communication unit 100 is described using an example where the communication unit 100 includes two phased array antennas as illustrated in FIG. 3.

Figure 6:
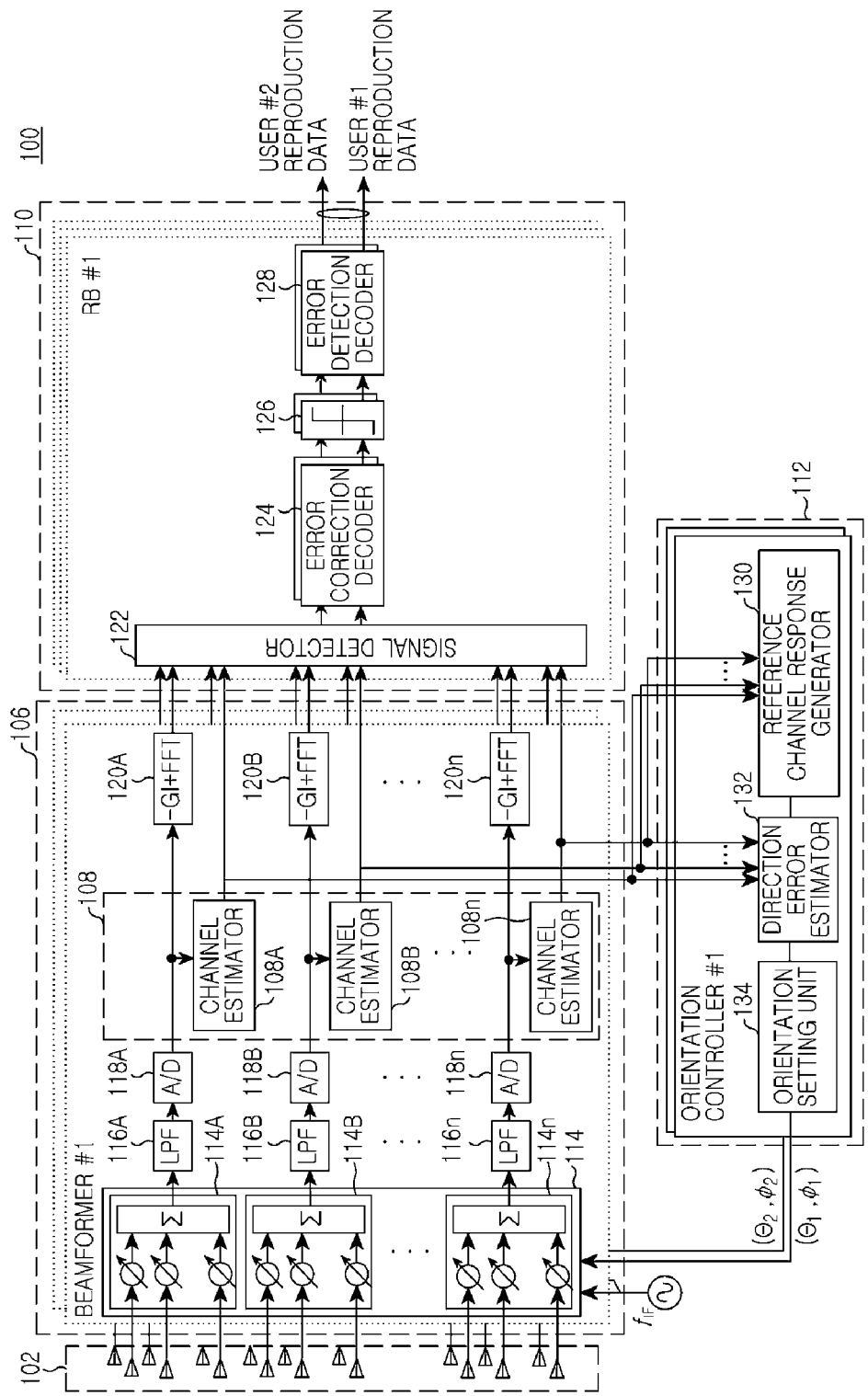
FIG. 6 is a block diagram illustrating a communication unit according to an embodiment of the present invention.

[2-1] The Summary of a Communication Unit According to an Embodiment of the Present Invention FIG. 6 is a block diagram illustrating a communication unit according to an embodiment of the present invention.

Referring to FIG. 6, the communication unit 100 may include a phased array antenna 102, a signal converter 106, a channel estimator 108, a signal processor 110, and an orientation controller 112. Here, the signal converter 106, the channel estimator 108, the signal processor 110, and the orientation controller 112 correspond to the receiver 104 illustrated in FIG. 3. Also, FIG. 6 illustrates an example of the construction of the communication unit 100, and illustrates a construction where the receiver 104 collectively processes signals received by respective antenna elements of a plurality of phased array antennas.

As described above, the phased array antenna 102 may include one or more phased array antennas. FIG. 6 illustrates an example where the phased array antenna 102 includes two phased array antennas as illustrated in FIG. 3. Hereinafter, one or more phased array antennas 102A and 102B forming the phased array antenna 102 may be denoted by a general term of a 'phased array antenna 102'.

In the phased array antennas forming the phased array antenna 102, a plurality of antenna elements are disposed on a plane to receive a signal transmitted from one or more transmitters.

Figure 7:
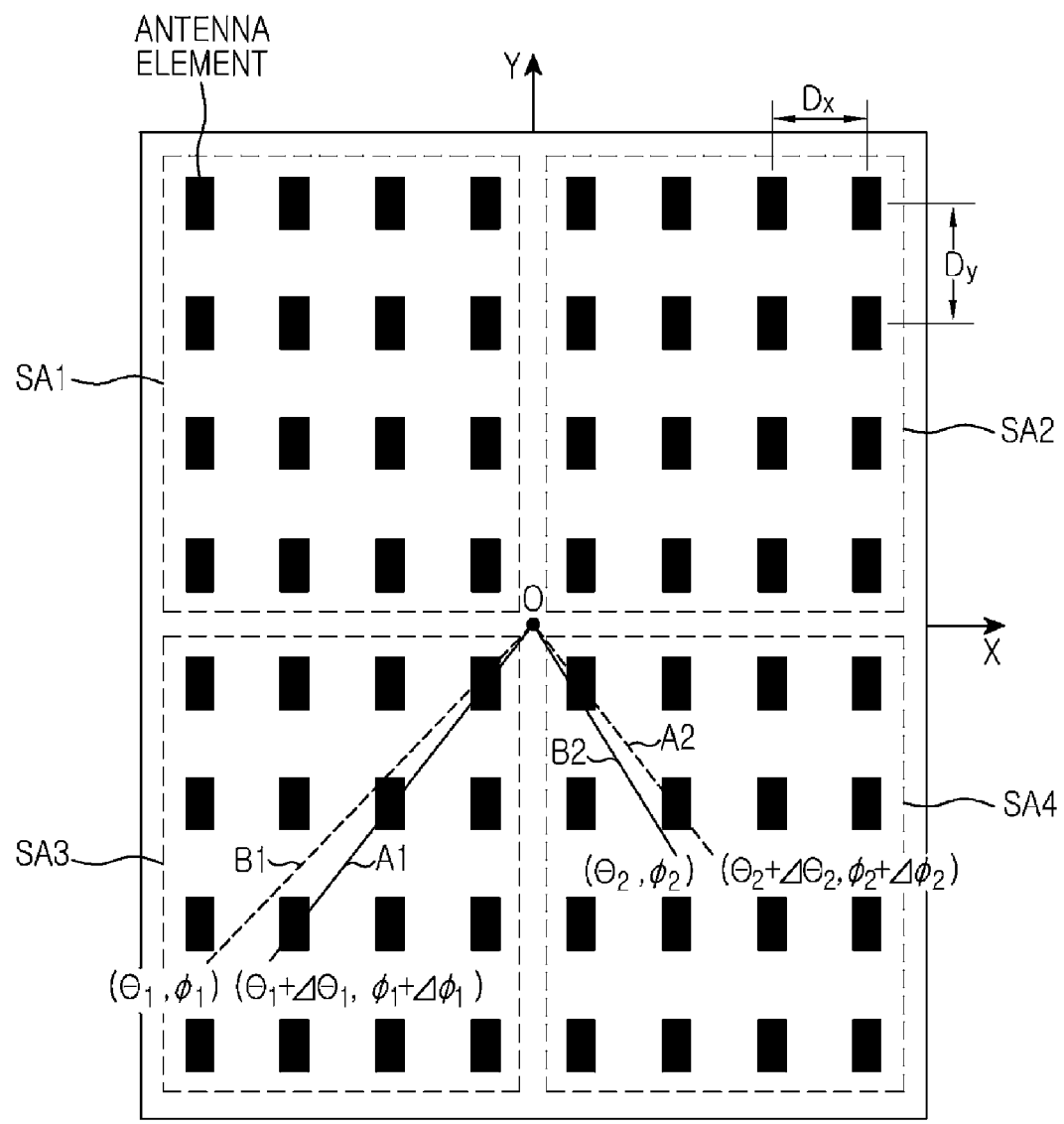
FIG. 7 is a view illustrating a structure of a phased array antenna of a communication unit according to an embodiment of the present invention.

FIG. 7 is a view illustrating a structure of a phased array antenna of a communication unit according to an embodiment of the present invention.

Referring to FIG. 7, a plurality of antenna elements forming a phased array antenna of the communication unit 100 may be grouped, and divided into a sub array. FIG. 7 illustrates an example where a plurality of antenna elements forming a phased array antenna are divided into four sub arrays SA1 to SA4.

Also, A1 illustrated in FIG. 7 represents a direction in which the transmitter 200A illustrated in FIG. 3 exists, and B1 represents an orientation direction in which the communication unit 100 faces the transmitter 200A. Likewise, A2 illustrated in FIG. 7 represents a direction in which the transmitter 200B illustrated in FIG. 3 exists, and B2 represents an orientation direction in which the communication unit 100 faces the transmitter 200B.

Referring to an azimuthal angle and an elevation angle $\theta 1$ and $\phi 1$ of A1 and an azimuthal angle and an elevation angle $\theta 1+\Delta\theta 1$ and $\phi 1+\Delta\phi 1$ of B1 illustrated in FIG. 7, an error $\Delta\theta 1$ of an azimuth angle and an error $\Delta\phi 1$ of an elevation angle exist between the direction in which the transmitter 200A exists and the orientation direction in which the communication unit 100 faces the transmitter 200A. The communication unit 100 may control orientation for the transmitter 200A in the phased array antenna 102 so that an error $\Delta\theta 1$ of an azimuth angle and an error $\Delta\phi 1$ of an elevation angle may be small. More specifically, the communication unit 100 may set an orientation direction in the phased array antenna 102 so that an error $\Delta\theta 1$ of an azimuth angle and an error $\Delta\phi 1$ of an elevation angle may be small.

Also, referring to an azimuthal angle and an elevation angle $\theta 2$ and $\phi 2$ of A2 and an azimuthal angle and an elevation angle $\theta 2+\Delta\theta 2$ and $\phi 2+\Delta\phi 2$ of B2 illustrated in FIG. 7, an error $\Delta\theta 2$ of an azimuth angle and an error $\Delta\phi 2$ of an elevation angle exist between the direction in which the transmitter 200B exists and the orientation direction in which the communication unit 100 faces the transmitter 200B. The communication unit 100 may control orientation for the transmitter 200B in the phased array antenna 102 so that an error $\Delta\theta 2$ of an azimuth angle and an error $\Delta\phi 2$ of an elevation angle may be small. More specifically, the communication unit 100 may set an orientation direction in the phased array antenna 102 so that an error $\Delta\theta 2$ of an azimuth angle and an error $\Delta\phi 2$ of an elevation angle may be small.

Also, though FIG. 7 illustrates an example where each sub array is formed of 16 antenna elements, the number of antenna elements forming a sub array in the communication unit 100 according to an embodiment of the present invention is not limited. For example, a sub array of the communication unit 100 according to an embodiment of the present invention may be formed of four of 2 (horizontal direction)×2 (vertical direction), or more antenna elements that allow beam control of azimuthal angle and elevation angle. Also, the number of sub arrays of the communication unit 100 according to an embodiment of the present invention is not limited to 4. For example, the phased array antenna 102 may be divided into two or more sub arrays. Also, though FIG. 7 illustrates the number of antenna elements forming each sub array is the same, the number of antenna elements forming each sub array may be different.

Also, in the case where the phased array antenna 102 includes a plurality of phased array antennas as illustrated in FIG. 3, the communication unit 100 may include a plurality of phased array antennas where the number of sub arrays of the phased array antenna and the number of antenna elements forming each sub array are the same. Also, in this case, the communication unit 100 may include a plurality of phased array antennas where one of the number of sub arrays in the phased array antenna and the number of antenna elements forming each sub array is different, or a plurality of different phased array antennas.

Referring to FIG. 6 again, the construction of the communication unit 100 is described. The signal converter 106 may synthesize a signal received by each antenna element of each sub array, and convert a signal synthesized in each sub array to a baseband signal.

The signal converter 106 may include a converter 114, low pass filters 116A, 116B, . . . , 116n (generally referred to as a 'low pass filter 116'), A/D converters 118A, 118B, . . . , 118n (generally referred to as an 'A/D converter 118'), and FFT circuits 120A, 120B, . . . , 120n (generally referred to as an 'FFT circuit 120').

FIG. 6 illustrates a construction where the signal converter 106 includes two beamforming units including the converter 114, the low pass filter 116, the A/D converter 118, and the FFT circuit 120. A beamforming unit 1 illustrated in FIG. 6 is a beamforming unit corresponding to the phased array antenna 120A illustrated in FIG. 3, and may process a signal received by each antenna element of the phased array antenna 102A. Also, an illustrated beamforming unit 2 is a beamforming unit corresponding to the phased array antenna 120B illustrated in FIG. 3, and may process a signal received by each antenna element of the phased array antenna 102B. The beamforming unit 2 may include the same construction as the beamforming unit 1 illustrated in FIG. 6.

Also, FIG. 6 illustrates an example where a beamforming unit according to an embodiment of the present invention includes channel estimators 108A, 108B, . . . , 108n corresponding to each sub array forming a channel estimator 108.

Also, the construction of the beamforming unit according to an embodiment of the present invention is not limited to the construction including the channel estimator 108. For example, the beamforming unit and the channel estimator 108 according to an embodiment of the present invention may be separate processing circuits.

The converter 114 may include converting circuits 114A, 114B, . . . , 114n having the same construction as the signal converter 34 illustrated in FIG. 2 in each sub array. The converter 114 may frequency-convert a signal received by each antenna element of each sub array, and synthesize a frequency-converted signal according to the construction illustrated in FIG. 6. Also, processing at the converter 114 may be controlled by an orientation controller 112 which will be described later.

As described above, a signal of each sub array is frequency-converted at the converter 114, and then synthesized, so that the synthesized signal of each sub array may become a beamformed signal. Therefore, the signal converter 106 may include one set of a low pass filter 116, an A/D converter 118, and an FFT circuit 120 every sub array as illustrated in FIG. 6.

Therefore, the communication unit 100 may reduce a circuit scale regarding signal processing of a signal received by a phased array antenna 102 compared to the conventional communication unit illustrated in FIG. 1.

A signal output from each of converting circuits 114A, 114B, . . . , 114n may be filtered by corresponding low pass filter 116, and then sampled by the A/D converter 118. That is, the low pass filter 116 may perform a role of a filtering circuit, and the A/D converter 118 may perform a role of a sampling circuit. As a signal is sampled by the A/D converter 118, subsequent processes at the communication unit 100 may become processes for a digital signal.

The FFT circuit 120 may remove a Guard Interval (GI) from a sampled signal transferred from the corresponding A/D converter 118, and convert a signal into a signal in the frequency domain by performing the FFT. Here, a signal output from the FFT circuit 120 may correspond to a baseband signal according to an embodiment of the present invention (for example, data including packet data modulated and mapped by the modulation mapping unit 208 of the transmitter 200 illustrated in FIG. 4).

The signal converter 106 may synthesize a signal received by each antenna element of each sub array, and convert the synthesized signal to a baseband signal according to the construction illustrated in FIG. 6.

Also, the construction of the signal converter 106 according to an embodiment of the present invention is not limited to the construction illustrated in FIG. 6. For example, though FIG. 6 illustrates the construction where the signal converter 106 serves as a filtering circuit and includes a low pass filter, the signal converter 106 according to an embodiment of the present invention may form a filtering circuit using a different filter such as a band pass filter, etc.

Also, though FIG. 6 illustrates a construction where the signal converter 106 includes two beamforming units including the converter 114, the low pass filter 116, the A/D converter 118, and the FFT circuit 120, the signal converter 106 according to an embodiment of the present invention may include the number of beamforming units corresponding to the number of phased array antennas. Also, the signal converter 106 according to an embodiment of the present invention may process a signal transmitted from the transmitters 200 equal to or greater than the number of provided beamforming units by using time division.

The channel estimator 108 may estimate a channel of each sub array based on a signal where signals received by antenna elements forming each sub array are synthesized by each sub array. The channel estimator 108 may include channel estimators 108A, 108B, . . . , 108n (generally referred to as the 'channel estimator 108' hereinafter) corresponding to each sub array.

The channel estimator 108 may estimate a channel of each sub array based on a digital signal corresponding to a synthesized signal of each sub array output from the A/D converter 118 forming the signal converter 106. In addition, the channel estimator 108 may transfer a channel estimated result of each sub array to the signal processor 110 (more specifically, a signal detector 122 which will be described later) and the orientation controller 112 (more specifically, a reference channel response generator 130 and a direction error estimator 132 which will be described later). A specific example of processing regarding channel estimation of each sub array at the channel estimator 108 is described later.

The signal processor 110 may decode reproduction data (reception data) based on a baseband signal of each sub array included in each resource block. Also, the signal processor 110 may detect an error of decoded reproduction data.

The signal detector 122 may detect a signal transmitted from the transmitter 200 (for example, the transmitter 200A and/or the transmitter 200B) based on a baseband signal corresponding to a sub array transferred from the FTT circuit 120 forming each beamforming unit, and a channel estimated result corresponding to a sub array transferred from the channel estimator 108.

The signal detector 122 is formed of a multi-user detector, and may detect a data section (for example, a data signal portion illustrated in FIG. 5) of a signal transmitted from one or more transmitters (for example, the transmitter 200A and the transmitter 200B) via the multi-user detector. That is, the signal detector 122 may perform a role of a multi-user signal detector that detects a signal of a multi-user.

The error correction decoder 124 may correct an error of a preamble signal of each transmitter 200 detected by the signal detector 122 based on a turbo code included in a preamble signal of each transmitter 200 detected by the signal detector 122, or a code for error correction such as an LDPC code, etc.

The decision circuit 126 may determine "0" and "1" of an error-corrected signal (digital signal), and output the decision result as reproduction data (reception data) corresponding to a signal transmitted from the transmitter 200.

An error detection decoder 128 may detect an error of reproduction data based on a code for error detection such as a CRC code, etc. included in the reproduction data transferred from the decision circuit 126.

The signal processor 110 may decode reproduction data (reception data) based on a baseband signal of each sub array included in each resource block. Also, the signal processor 110 may detect an error of decoded reproduction data according to the construction illustrated in FIG. 6.

Also, the construction of the signal processor 110 according to an embodiment of the present invention is not limited to the construction illustrated in FIG. 6.

For example, though FIG. 6 illustrates a construction where the signal processor 110 includes the error correction decoder 124 to correct an error and then decode reproduction data, the signal processor 110 according to an embodiment of the present invention may not include the error correction decoder 124.

For another example, though FIG. 6 illustrates a construction where the signal processor 110 includes the error detection decoder 128 to detect an error of reproduction data, the signal processor 110 according to an embodiment of the present invention may not include the error detection decoder 128.

The orientation controller 112 may control orientation at the phased array antenna based on a channel estimated result of each sub array. The orientation controller 112 may control orientation at each of the phased array antennas included in the phased array antenna 102.

The orientation controller 112 illustrated in FIG. 6 includes an orientation controller 1 that controls orientation at the phased array antenna 102A illustrated in FIG. 3, and an orientation controller 2 that controls orientation at the phased array antenna 102B illustrated in FIG. 3. At this point, the orientation controller 2 may have the same construction as the orientation controller illustrated in FIG. 6.

Also, the construction of the orientation controller 112 according to an embodiment of the present invention is not limited to a construction where each of phased array antennas included in the phased array antenna 102 individually includes an orientation controller corresponding to each phased array antenna. For example, the orientation controller 112 according to an embodiment of the present invention may control orientation at one or more phased array antennas included in the phased array antenna via one processing circuit.

The orientation controller 112 may include a reference channel response generator 130, a direction error estimator 132, and an orientation setting unit 134.

The reference channel response generator 130 may generate a reference channel response serving as a reference in orientation control based on a channel estimated result of each sub array. Also, specific examples for processings of a reference channel response and the reference channel response generator 130 according to an embodiment of the present invention are described later.

The direction error estimator 132 may estimate an error (referred to as a 'direction error' hereinafter) of a direction that allows to face an orientation at the phased array antenna 102 based on a channel estimated result of each sub array and a reference channel response generated at the reference channel response generator 130. Here, the direction error according to an embodiment of the present invention may be "an error $\Delta\theta 1$ of an azimuthal angle and an error $\Delta\phi 1$ of an elevation angle" or "an error $\Delta\theta 2$ of an azimuthal angle and an error $\Delta\phi 2$ of an elevation angle" illustrated in FIG. 7. Also, a specific example for processing at the direction error estimator 132 is described later.

The orientation setting unit 134 may control orientation at the phased array antenna based on a channel estimated result of each sub array according to the construction illustrated in FIG. 6.

[2-2] Orientation Control Process at a Communication Unit According to an Embodiment of the Present Invention Subsequently, an orientation control process at the communication unit 100 according to an embodiment of the present invention is described.

Figure 8:
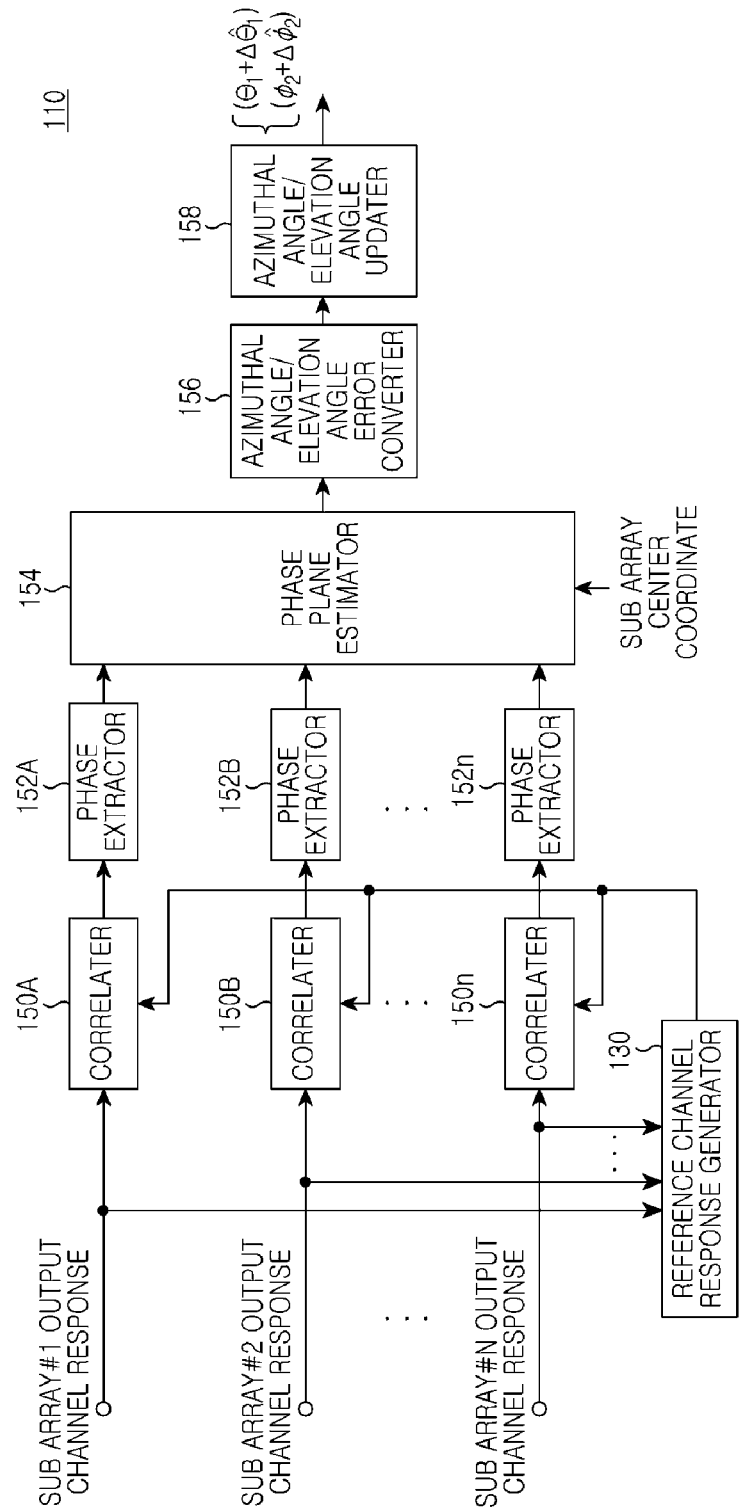
FIG. 8 is a view illustrating an example of an orientation control process of a communication unit according to an embodiment of the present invention.

FIG. 8 is a view illustrating an example of an orientation control process of a communication unit according to an embodiment of the present invention. Here, FIG. 8 illustrates the construction of the orientation controller 112 according to an embodiment of the present invention.

As described above, in the communication unit 100, a controller (not shown) configured using a CPU, etc. may perform a role of the orientation controller 112, and the orientation controller 112 forming the receiver 102 may be implemented by a dedicated (or universal) processing circuit. Also, each process of the orientation controller 112 may be performed by a hardware, and performed via execution of a software (a program).

Hereinafter, an example of the construction of the orientation controller 122 and an example of an orientation control process at the communication unit 100 are described using a case of processing orientation for the transmitter 200A as an example. Also, in the construction of the orientation controller 112 illustrated in FIG. 8, the communication unit 100 may control orientation for the transmitter 200B illustrated in FIG. 3 by performing a process such as an orientation control process at the communication unit 100 illustrated below.

Also, hereinafter, the transmitter 200 may be denoted by a 'user', and also the transmitter 200A may be denoted by a 'user 1', and the transmitter 200B may be denoted by a 'user 2'.

The orientation controller 112 may include a reference channel response generator 130, correlaters 150A, 150B, ..., 150n corresponding to each sub array, phase extractors 152A, 152B, ..., 152n corresponding to each sub array, a phase plane estimator 154, an azimuthal angle/elevation angle error converter 156, and an azimuthal angle/elevation angle error updater 158.

Here, the correlaters 150A, 150B, ..., 150n (referred to as a general term of a 'correlater 150'), the phase extractors 152A, 152B, ..., 152n (referred to as a general term of a 'phase extractor 152'), and the phase plane estimator 154 may correspond to the direction error estimator 132. Also, the azimuthal angle/elevation angle error converter 156, and the azimuthal angle/elevation angle error updater 158 may correspond to the orientation setting unit 134. Also, in the orientation controller 112, the azimuthal angle/elevation angle error converter 156 may correspond to the direction error estimator 132, and the azimuthal angle/elevation angle error updater 158 may correspond to the orientation setting unit 134.

Hereinafter, an orientation control process at the electronic device 100 according to an embodiment of the present invention is described with reference to FIGS. 6 and 8.

Assuming a signal synthesized at a sub array of a time k in sub array n ($1 \leq n \leq N$) of a beamforming unit corresponding to a user u (u=1, 2) is "xu, n(k)", "xu, n(k)" may be expressed by Equation (1) below. Here, "su, n(k)" shown in Equation (1) represents a signal transmitted from a user u. Also, "hu, n(1)" shown in Equation (1) represents a channel response of a sample extension 1 in an output of a sub array n, and "$\eta(k)$" shown in Equation (1) represents a noise.

$$x_{u,n}(k) = \sum_{l=0}^{L-1} h_{u,n}(l) s_u(k-l) + \eta(k) \quad (1)$$

As illustrated with reference to FIG. 5, since interference does not occur between users in a preamble portion, Equation (1) does not include an interference component.

When responses up to sample extensions $l=0, \ldots, L-1$ are expressed as a vector, they may be expressed by Equation (2). Here, "L−1" shown in Equation (2) may be set to a sample length of an about maximum extension time.

$$h_{u,n} = [h_{u,n}(0), h_{u,n}(1), \ldots, h_{u,n}(L-1)]T \quad (2)$$

A preamble portion may know "su(k)" shown in Equation (1) in advance. Therefore, the channel estimator 108 may estimate a channel of each sub array by performing an operation shown in Equation (3) based on a signal (a signal synthesized at each sub array) output from each sub array. Here, $\hat{h}_{u,n}$ shown in Equation (3) represents a channel vector estimated value (an example of a channel estimated result) at a sub array n.

$$\hat{h}_{u,n} = [\hat{h}_{u,n}(0), \hat{h}_{u,n}(1), \ldots, \hat{h}_{u,n}(L-1)]^T \quad (3)$$

The reference channel response generator 130 may generate a reference channel response based on a channel estimated result of each sub array estimated by the channel estimator 108. The reference channel response generator 130 may synthesize a channel vector representing a channel estimated result of each sub array estimated by the channel estimator 108 at all sub arrays as expressed in Equation (4).

$$\hat{h}_u = \frac{1}{N} \sum_{n=1}^{N} \hat{h}_{u,n} \quad (4)$$

Here, a channel vector estimated value representing a channel estimated result of each sub array is synthesized at all sub arrays, so that it may become a channel vector corresponding to all arrays. Therefore, the reference channel response generator 130 may determine a channel vector corresponding to all arrays generated by the operation shown in Equation (4) as a reference channel vector, that is, a reference channel response.

The correlater 150 may perform a correlation operation on a channel estimated result of each sub array and a generated reference channel response. The correlater 150 may calculate correlation between a channel vector estimated value representing a channel estimated result of each sub array and a reference channel response by performing an operation shown in Equation (5) below. Here, "ρu(n)" shown in Equation (5) means a correlation value representing correlation between a channel vector estimated value corresponding to a sub array n and a reference channel response.

$$\rho_u^{(n)} = \frac{1}{L} \hat{h}_{u,n}^T \hat{h}_u^{(*)} = \frac{1}{L} \sum_{l=0}^{L-1} \hat{h}_{u,n}(l) \hat{h}_u^{(*)}(l) \quad (5)$$

Assuming a value normalizing a correlation value "ρu(n)" is "ρu(n)'", a phase shift amount proportional to an error between an arriving direction of a signal transmitted from the transmitter 200 and orientation at a phased array antenna may be represented as an imaginary part of "ρu(n)'".

Therefore, the phase extractor 152 may detect a phase error component of each sub array by extracting the imaginary part of "ρu(n)'" at each sub array as illustrated in Equation (6) below.

$$\xi_u(n) = Im\{\overline{\rho}_u^{(n)}\} \quad (6)$$

The direction error estimator 132 may have a function of detecting a phase error component of each sub array based on correlation between a channel estimated result of each sub array and a generated reference channel response by including the correlater 150 and the phase extractor 152 performing the above-described processes.

The phase plane estimator 154 may estimate a phase error by calculating phase rotation amounts of an azimuthal angle and an elevation angle by plane estimation based on a phase rotation amount (a phase error component) transferred from the phase extractor 152 and corresponding to each sub array, and a coordinate of a sub array center in each sub array.

More specifically, the phase plane estimator 154 may calculate phase rotation amounts of an azimuthal angle and an elevation angle by plane estimation that uses a least square method. Also, phase plane estimation performed by the phase plane estimator 154 is not limited to phase plane estimation that uses the least square method. For example, the phase plane estimator 154 may calculate phase rotation amounts of an azimuthal angle and an elevation angle by phase plane estimation using another estimation method such as a robust estimation, etc. Hereinafter, a process at the phase plane estimator 154 is described using a case where the phase plane estimator 154 calculates phase rotation amounts of an azimuthal angle and an elevation angle by phase plane estimation using the least square method as an example.

Here, a coordinate of a sub array center in each sub array may be represented by Equation (7) below. "(dix(x), diy(y))" shown in Equation (7) may represent an array coordinate for an array index (ix, iy), and "$\Lambda$" shown in Equation (7) may represent a subset of an array included in a sub array n. Therefore, "ax(n), ay(n)" shown in Equation (7) may represent a coordinate of an array center normalized at a wavelength h of a sub array n.

$$\begin{cases} a_x(n) = \frac{1}{N} \sum_{i_x \in \Lambda_n} \frac{d_{i_x}^{(x)}}{\lambda} \\ a_y(n) = \frac{1}{N} \sum_{i_y \in \Lambda_n} \frac{d_{i_y}^{(y)}}{\lambda} \end{cases} \quad (7)$$

Figure 9:
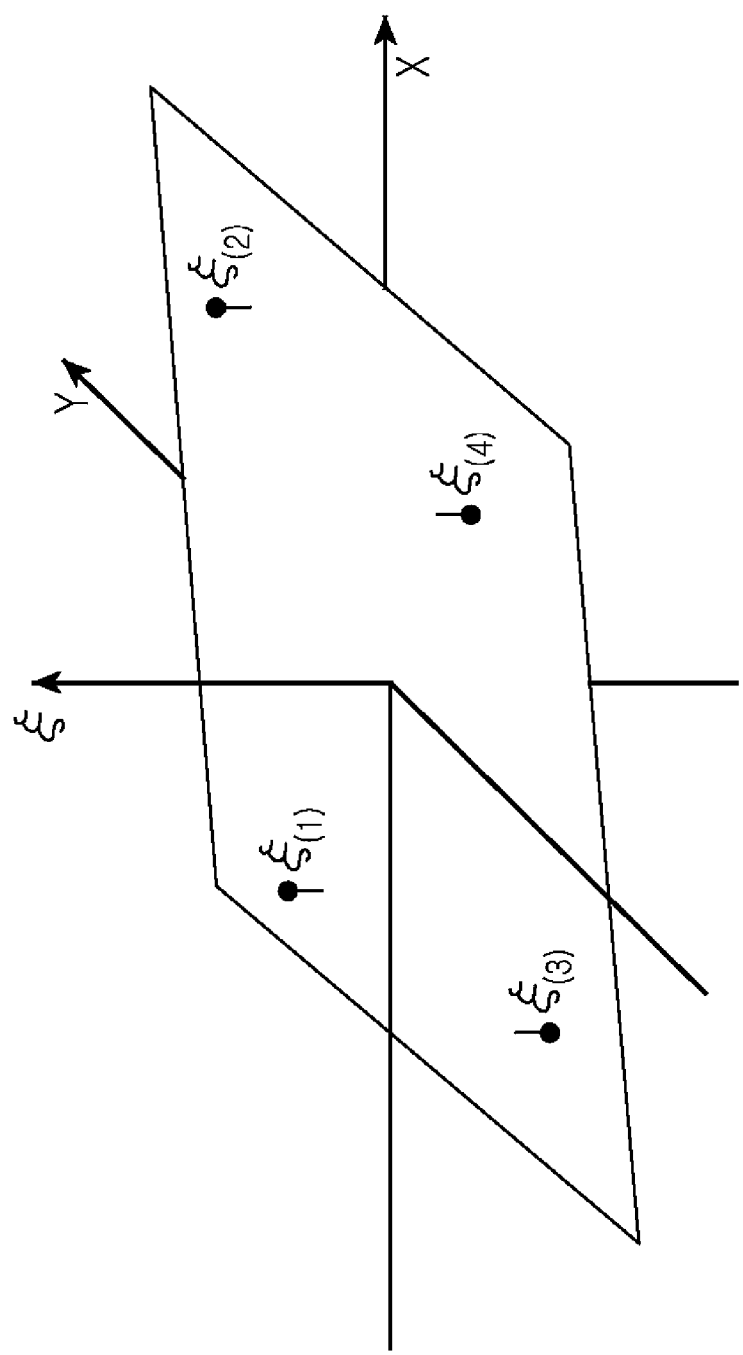
FIG. 9 is a view illustrating relation between a phase rotation amount of a communication unit and a coordinate of a sub array center according to an embodiment of the present invention.

FIG. 9 is a view illustrating relation between a phase rotation amount of a communication unit and a coordinate of a sub array center according to an embodiment of the present invention. Here, FIG. 9 illustrates an example of relation among a phase rotation amount extracted by the phase extractor 152, a phase rotation amount estimated by the phase plane estimator 154, and a coordinate of a sub array center. A slope of a plane illustrated in FIG. 9 corresponds to a phase rotation amount.

A phase rotation amount estimated by the phase plane estimator 154 may be expressed by Equation (8) below. Also, relation among a phase rotation amount extracted from the phase extractor 152, a phase rotation amount estimated by the phase plane estimator 154, and a coordinate of a sub array center may be expressed by Equation (9) below.

$$e_u = [e_u^{(x)}, e_u^{(y)}]^T \quad (8)$$

$$\begin{bmatrix} \xi_u(1) \\ \xi_u(2) \\ \vdots \\ \xi_u(N) \end{bmatrix} = \begin{bmatrix} a_x(1) & a_y(1) \\ a_x(2) & a_y(2) \\ \vdots & \vdots \\ a_x(N) & a_y(N) \end{bmatrix} \begin{bmatrix} e_u^{(x)} \\ e_u^{(y)} \end{bmatrix} \quad (9)$$

When Equation (9) is expressed as a vector, relation among a phase rotation amount extracted from the phase extractor 152, a phase rotation amount estimated by the phase plane estimator 154, and a coordinate of a sub array center may be expressed by Equation (10) below.

$$\xi_u = A e_u \quad (10)$$

Phase rotation amounts of an azimuthal angle and an elevation angle may be calculated via an operation represented by Equation (11) below using the least square method. That is, the phase plane estimator 154 may estimate a phase error by performing the operation illustrated in Equation (11).

$$e_u = (A^T A)^{-1} A^T \xi_u \quad (11)$$

The direction error estimator 132 may have a function of estimating a phase error based on an extracted phase error component of each sub array by having the above phase plane estimator 154.

The azimuthal angle/elevation angle error converter 156 may convert phase rotation amounts (estimated phase errors) of an azimuthal angle and an elevation angle calculated by the phase plane estimator 154 to an error of an azimuthal angle and an error of an elevation angle (direction error).

More specifically, assuming that an azimuthal angle and an elevation angle of a currently set beam is $(\theta_u, \varphi_u)$, the azimuthal angle/elevation angle error converter 156 may convert phase rotation amounts of an azimuthal angle and an elevation angle calculated by the phase plane estimator 154 to an error of an azimuthal angle and an error of an elevation angle by performing the operation illustrated in Equation (12) below. Here, "$\Delta\hat{\theta}_u$" shown in Equation (12) represents an azimuthal error, and "$\Delta\hat{\varphi}_u$" shown in Equation (12) represents an error of an elevation angle.

$$\begin{cases} \Delta\hat{\theta}_u = e_u^{(x)} / 2\pi \cos\theta_u \\ \Delta\hat{\varphi}_u = e_u^{(y)} / 2\pi \cos\varphi_u \end{cases} \quad (12)$$

The azimuthal angle/elevation angle error updater 158 may set (or reset) an orientation direction at a phased array antenna based on an error of an azimuthal angle and an error of an elevation angle calculated by the azimuthal angle/elevation angle error converter 156.

More specifically, the azimuthal angle/elevation angle error updater 158 may update an azimuthal angle and an elevation angle regulating an orientation direction at a phased array antenna forming the phased array antenna 102 by performing the operation illustrated in Equation (13) below. The updated azimuthal angle and elevation angle may be used as orientation of a beam at the next time slot at the signal converter 106.

$$\begin{cases} \theta_u = \theta_u + \Delta\hat{\theta}_u \\ \varphi_u = \varphi_u + \Delta\hat{\varphi}_u \end{cases} \quad (13)$$

Also, a process for update of an azimuthal angle and an elevation angle regulating an orientation direction at a phased array antenna forming the phased array antenna 102 at the azimuthal angle/elevation angle error updater 158 is not limited to performing the operation shown in Equation (13). For example, the azimuthal angle/elevation angle error updater 158 may update an azimuthal angle and an elevation angle regulating an orientation direction at a phased array antenna forming the phased array antenna 102 by performing an operation shown in Equation (14) that uses a step size parameter "$\mu$" for an adaptive algorithm.

$$\begin{cases} \theta_u = \theta_u + \mu \cdot \Delta\hat{\theta}_u \\ \varphi_u = \varphi_u + \mu \cdot \Delta\hat{\varphi}_u \end{cases} \quad (14)$$

Here, a step size parameter "$\mu$" may be a fixed value such as $\mu=0.1$, etc. set in advance, but a step size parameter "$\mu$" according to an embodiment of the present invention is not limited to a fixed value. For example, the azimuthal angle/elevation angle error updater 158 may make a value of a step size parameter "$\mu$" small gradually from an initial value.

The azimuthal angle/elevation angle error updater 158 updates an azimuthal angle and an elevation angle regulating an orientation direction at a phased array antenna 102 using the step size parameter "$\mu$", so that the communication unit 100 may reduce an influence of a noise even more.

The orientation setting unit 134 may have a function of setting an orientation direction at the phased array antenna 102 based on a direction error between an arriving direction of a signal where a phase error estimated by the direction error estimator 132 has been converted and a setting direction of orientation at the phased array antenna 102. Also, though a case where the azimuthal angle/elevation angle error converter 156 forms the orientation setting unit 134 has been taken as an example in the above description, the azimuthal angle/elevation angle error converter 156 may form the direction error estimator 132 in the orientation controller 112.

The orientation controller 112 performs the orientation control process in the communication unit 100, so that the orientation of the phased array antenna 102 may be controlled.

Also, in the communication unit 100, the phased array antennas 102A and 102B may perform the above orientation control process on a user 1 and a user 2, respectively, based on channel estimated results of the respective phased array antennas 102A and 102B. Therefore, the communication unit 100 may perform an orientation control of a high accuracy whose process at a channel response region is simple on a phased array antenna (two-dimensional antenna array) without an influence of interference between users.

Also, in the case where a plurality of users who are accessing simultaneously are positioned with a sufficient angle difference, the communication unit 100 may perform reception while separating the plurality of users by orientation of an array with the construction illustrated in FIGS. 6 and 8, a good reception signal characteristic may be implemented.

Also, in the case where an angle difference of a plurality of users who are accessing simultaneously is small, since orientation of respective phased array antennas approaches, possibility that a signal of a different user is received as a beam interference. However, in the communication unit 100, the signal detector 122 forming the signal processor 110 may utilize a beam interference as a useful reception signal component of a different user using the construction illustrated in FIGS. 6 and 8. Therefore, even in the case an angle difference of a plurality of users who are accessing simultaneously is small, the communication unit 100 may improve a signal detection characteristic known as a space diversity effect using the construction illustrated in FIGS. 6 and 8.

[2-3] An Effect by an Orientation Control Process at a Communication Unit According to an Embodiment of the Present Invention Next, an example of an effect by an orientation control process at the above-described communication unit 100 is described.

Figure 10:
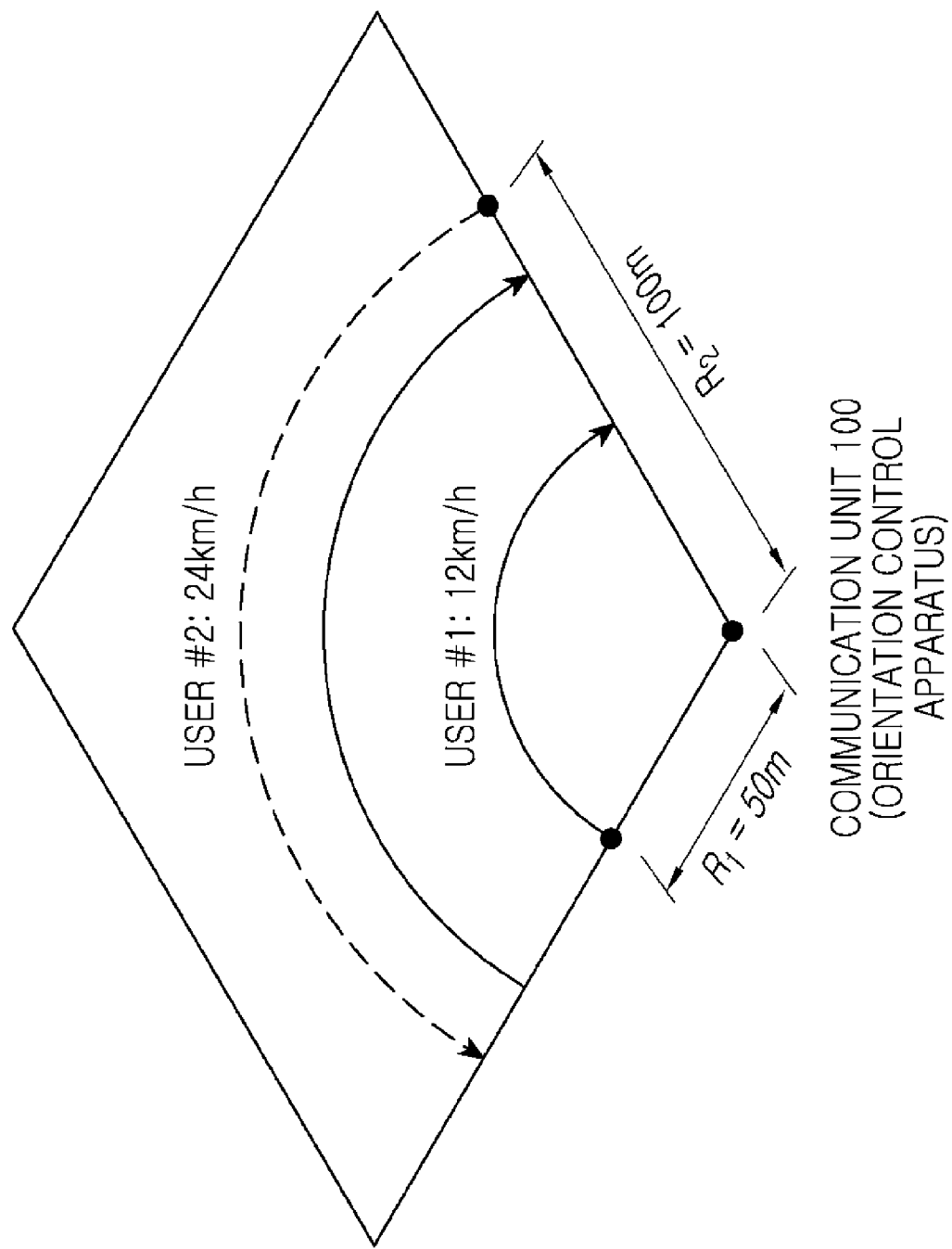
FIG. 10 is a view illustrating an effect of an orientation control process in a communication unit according to an embodiment of the present invention.
Figure 11:
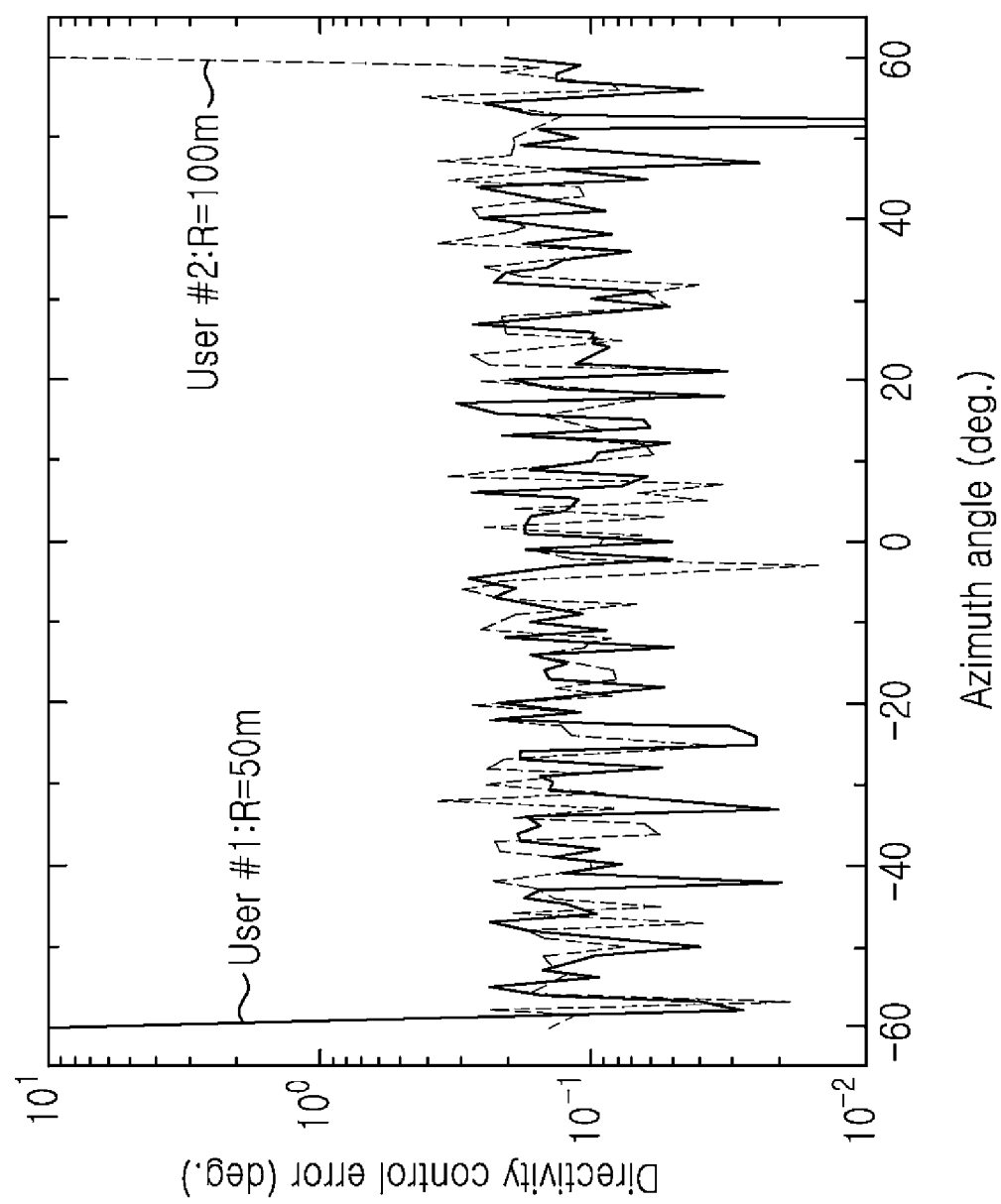
FIG. 11 is a view illustrating an effect of an orientation control process in a communication unit in the form of a graph according to an embodiment of the present invention.

FIGS. 10 and 11 are views illustrating an effect by an orientation control process in a communication unit 100 according to an embodiment of the present invention. Here, FIG. 10 illustrates a mobile model of the transmitters 200A and 200B illustrated in FIG. 3, and FIG. 11 illustrates an example of a direction error result at the mobile model illustrated in FIG. 10. FIGS. 10 and 11 represent the transmitter 200A as a 'user 1', and represent the transmitter 200B as a 'user 2'.

FIG. 10 illustrates a mobile model where a user 1 moves at 12 km/h on a concentric circle from the left end of a cell, separated by 50 m from the communication unit 100, and a user moves at 24 km/h on a concentric circle from the right end of the cell, separated by 100 m from the communication unit 100. Also, in FIG. 10, it is considered that an electric energy condition is unpredicted (unpredicted circumstance), and arriving angle extension of a signal is small by an orientation antenna of a user (the transmitter 200).

FIG. 11 illustrates a user tracing characteristic at the mobile model illustrated in FIG. 10. As illustrated in FIG. 11, it is known that the communication unit 100 performs an orientation control process according to an embodiment of the present invention, so that an orientation control error is suppressed within 0.4 degree.

Therefore, the communication unit 100 may implement an excellent tracing characteristic and improve accuracy of an orientation control by performing the above-described orientation control process according to the embodiment of the present invention.

[2-4]

As described above, the communication unit 100 according to an embodiment of the present invention may have converting circuits 114A, 114B, ..., 114n in each sub array where a plurality of antenna elements forming the phased array antenna 102 have been grouped as illustrated in FIG. 6. Therefore, the communication unit 100 may have one set of a circuit regarding a signal process such as the low pass filter 116, the A/D converter 118, the FFT circuit 120, etc. in each sub array as illustrated in FIG. 6.

Therefore, the communication unit 100 may reduce a circuit scale regarding a signal process of a signal received by the phased array antenna 102 compared to the conventional communication unit illustrated in FIG. 1.

Also, the communication unit 100 may control orientation at the phased array antenna 102 using a channel estimated result of each sub array obtained based on a signal synthesized at each sub array by an orientation control process according to an embodiment of the present invention.

Therefore, the communication unit 100 has effects of simplifying a signal process required for an orientation control and performing an orientation control of a high accuracy by using a channel estimated value obtained from a preamble signal used for signal detection for an orientation control of a phased array antenna.

Therefore, the communication unit 100 may improve an accuracy of an orientation control while suppressing an increase of a circuit scale regarding a process for a signal received by a phased array antenna.

[2-5] An Example of Modification of an Orientation Control Apparatus According to an Embodiment of the Present Invention In the above, description has been made using a case where an orientation control apparatus according to an embodiment of the present invention is the communication unit 100 having a communication function, and controls orientation at a phased array antenna provided to the relevant unit as an example. However, the construction of the orientation control apparatus according to an embodiment of the present invention is not limited to the above construction.

[2-5-1] First Modified Example

For example, an orientation control apparatus according to an embodiment of the present invention may be configured using the orientation control apparatus 112 illustrated in FIG. 6.

In the case where an orientation control apparatus according to an embodiment of the present invention is configured using the orientation control apparatus 112, an orientation control apparatus according to the first modified example performs an orientation control process according to an embodiment of the present invention based on a channel estimated result of each sub array obtained from an external device having a function of the channel estimator 108. Also, the orientation control apparatus according to the first modified example may control orientation of a phased array antenna at an external communication unit having a phased array antenna.

[2-5-2] Second Modified Example

For another example, an orientation control apparatus according to an embodiment of the present invention may be configured using the channel estimator 108 and the orientation controller 112 illustrated in FIG. 6.

In the case where the orientation control apparatus according to an embodiment of the present invention is configured using the channel estimator 108 and the orientation controller 112, an orientation control apparatus according to the second modified example may estimate a channel of each sub array based on a signal synthesized at each sub array in an external communication unit having a phased array antenna. Also, the orientation control apparatus according to the second modified example may perform an orientation control process according to an embodiment of the present invention based on a channel estimated result of each sub array. Also, the orientation control apparatus according to the second modified example may control orientation of a phased array antenna at an external communication unit having a phased array antenna.

[2-5-3] Third Modified Example

For still another example, an orientation control apparatus according to an embodiment of the present invention may be configuration without the channel estimator 108 in the configuration illustrated in FIG. 6. In the case where the orientation control apparatus is configuration without the channel estimator 108 in the configuration illustrated in FIG. 6, an orientation control apparatus according to the third modified example may perform the orientation control process according to an embodiment of the present invention based on a channel estimated result of each array obtained from an external device having a function of the channel estimator 108. Also, the orientation control apparatus according to the third modified example may control orientation of a phased array antenna at a relevant unit.

Even when the orientation control apparatus according to an embodiment of the present invention represents configuration according to the first to third modified examples, the orientation control apparatus may control orientation of a phased array antenna provided to a relevant unit or an external device based on the orientation control process according to an embodiment of the present invention. Also, even when the orientation control apparatus according to an embodiment of the present invention represents configuration according to the first to third modified examples, a circuit scale regarding a signal process of a signal received by a phased array antenna may reduce in a system including the orientation control apparatus according to an embodiment of the present invention and the external device.

Therefore, even when the orientation control apparatus according to an embodiment of the present invention represents configuration according to the first to third modified examples, the orientation control apparatus may improve accuracy of an orientation control while not increasing a circuit scale regarding a signal process of a signal received by a phased array antenna.

Also, even when the orientation control apparatus according to an embodiment of the present invention represents configuration according to the first to third modified examples, a system having the orientation control apparatus according to an embodiment of the present invention and the external device may have the same effect as that of the communication unit 100 illustrated in FIG. 6.

<An Orientation Control Method According to an Embodiment of the Present Invention>

Subsequently, an example of an orientation control method according to an embodiment of the present invention is described. Hereinafter, as an example of a process regarding an orientation control method according to an embodiment of the present invention, a process of a case where an orientation control apparatus according to an embodiment of the present invention is the communication unit 100 having a communication function, and controls orientation at a phased array antenna provided to the relevant unit is exemplarily described.

Figure 12:
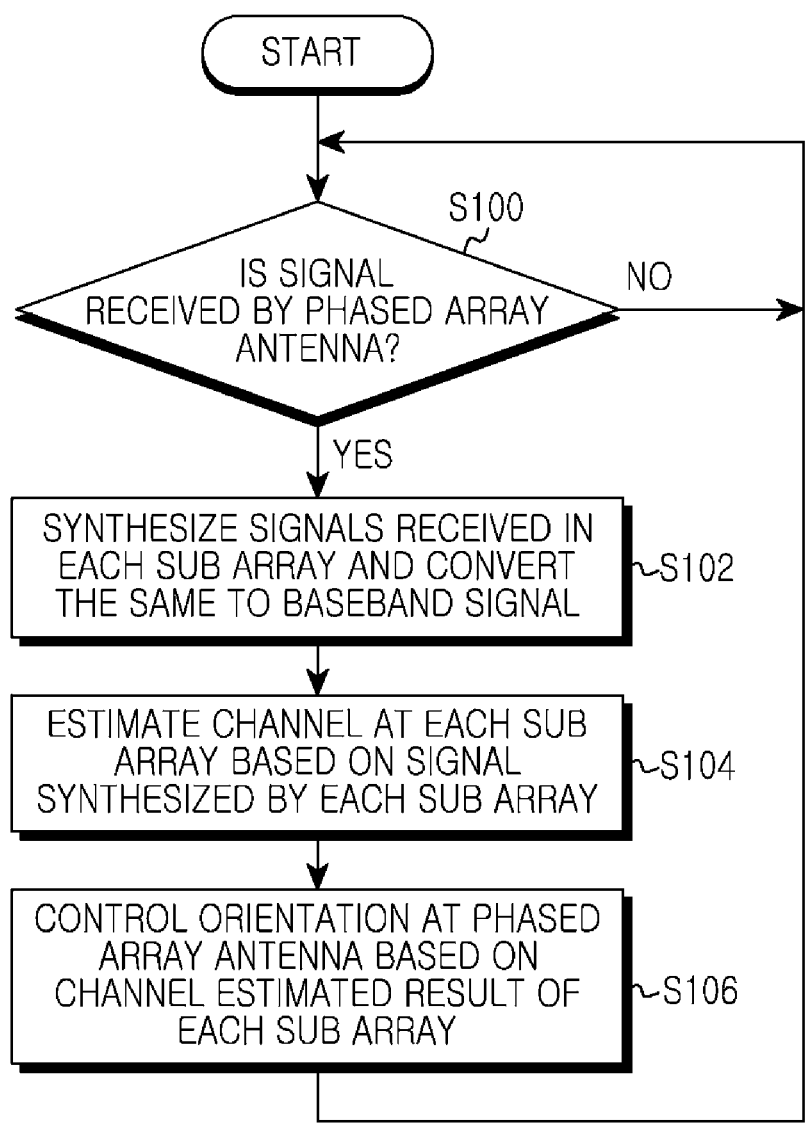
FIG. 12 is a flowchart illustrating an example of a method for controlling orientation according to an embodiment of the present invention.

FIG. 12 illustrates an example of a method for controlling orientation according to an embodiment of the present invention. Here, a process of step S102 illustrated in FIG. 12 corresponds to a process at the signal converter 106 illustrated in FIG. 6. Also, a process of step S104 illustrated in FIG. 12 corresponds to a process at the channel estimator 108 illustrated in FIG. 6. Also, a process of step S106 illustrated in FIG. 12 corresponds to a process at the orientation controller 112 illustrated in FIG. 6.

Hereinafter, description is made using a case where the communication unit 100 (an example of the orientation control apparatus according to an embodiment of the present invention) performs the process illustrated in FIG. 12 as an example.

Also, a process for an orientation control method according to an embodiment of the present invention is not limited to being performed by the communication unit 100. For example, the process illustrated in FIG. 12 may be performed by a system including an arbitrary orientation control apparatus among the orientation control apparatus according to the first modified example represented in [2-5-1] to the orientation control apparatus according to the third modified example represented in [2-5-3] and an external device.

The communication unit 100 may determine whether a signal transmitted from a transmitter has been received from a phased array antenna (S100). When a signal is transferred from an antenna element forming a phased array antenna, the communication unit may determine a signal has been received.

When not determining that a signal has been received in step S100, the communication unit 100 may not proceed with the process until it is determined that a signal has been received.

Also, when determining a signal has been received in step S100, the communication unit 100 may synthesize a signal received by each antenna element in each sub array where a plurality of antenna elements forming a phased array antenna have been grouped, and convert a signal synthesized in each sub array to a baseband signal (S102). Here, the process of step S102 corresponds to the process at the signal converter 106 illustrated in FIG. 6.

The communication unit 100 may estimate a channel in each sub array based on a signal synthesized in each sub array (S104). Here, the process of step S104 corresponds to the process at the channel estimator 108 illustrated in FIG. 6.

The communication unit 100 may process orientation at the phased array antenna based on a channel estimated result of each sub array (S106). Also, the communication unit 100 may repeat the process from step S100. Here, the process of S106 corresponds to the process at the orientation controller 112 illustrated in FIG. 6.

The communication unit 100 may control orientation at the phased array antenna by performing the process illustrated in FIG. 12.

Here, since the communication unit 100 synthesizes a signal received by each sub array and convert the same to a baseband signal in step S102, the communication unit 100 may have one set of a circuit regarding a signal process such as the low pass filter 116, the A/D converter 118, the FFT circuit 120, etc. in each sub array as illustrated in FIG. 6. Therefore, in case of performing the process illustrated in FIG. 12, the communication unit 100 may reduce a circuit scale regarding a signal process of a signal received by the phased array antenna 102 compared to the conventional communication unit illustrated in FIG. 1.

Also, in step S106, the communication unit 100 may control orientation at the phased array antenna 102 based on a channel estimated result estimated at each sub array in step S104. Therefore, the communication unit 100 may perform an orientation control of high accuracy while simplifying a signal process required for an orientation control by using a channel estimated value obtained from a preamble signal used for signal detection, for orientation control of the phased array antenna.

Therefore, the communication unit 100 may improve accuracy of an orientation control while suppressing an increase of a circuit scale regarding a signal process of a signal received by the phased array antenna, by performing the control illustrated in FIG. 12.

Also, a process regarding an orientation control method according to an embodiment of the present invention is not limited to the process illustrated in FIG. 12. For example, in the case where the orientation control apparatus according to the embodiment of the present invention is the orientation control apparatus according to the first modified example represented in [2-5-1], the orientation control apparatus according to the embodiment of the present invention may perform the process of step S106 illustrated in FIG. 12 as a process regarding the orientation control method according to the embodiment of the present invention. For another example, in the case where the orientation control apparatus according to the embodiment of the present invention is the orientation control apparatus according to the second modified example represented in [2-5-2], the orientation control apparatus according to the embodiment of the present invention may perform the processes of steps S104 and S106 illustrated in FIG. 12 as a process regarding the orientation control method according to the embodiment of the present invention.

Up to now, though a communication unit has been exemplarily described as an embodiment of the present invention, the embodiment of the present invention is not limited to the communication unit. For example, the embodiment of the present invention is applicable to various apparatuses that may control orientation at a phased array antenna such as a device playing a role of a base station or a device playing a role of a wireless access point, etc. Also, the embodiment of the present invention may be implemented as a signal process Integrated Circuit (IC) that may be inserted into the above-described apparatus.

<A Program According to an Embodiment of the Present Invention>

The present invention may improve accuracy of an orientation control while suppressing an increase of a circuit scale regarding a signal process of a signal received by a phased array antenna by allowing a program (program that may execute the process regarding the orientation control method according to an embodiment of the present invention, for example) for operating a computer as the orientation processing unit according to the embodiment of the present invention to be executed on the computer.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

For example, though it has been described that a program (a computer program) for operating a computer as the orientation control apparatus according to the embodiment of the present invention is provided, an embodiment of the present invention may provide together a recording medium that has recorded the above program thereon.

Though the detailed description of the present invention has described a specific embodiment, the system, the apparatus, and the method described in the present specification may be corrected, added, or omitted as far as they do not depart from the scope of the present invention. For example, elements and units of the system may combine or may be separated. Furthermore, operations of the system and units may be executed by more devices or less devices, or other devices. The method may include more steps, less steps, or other steps. Also, steps may combine and/or may be executed in an arbitrary proper sequence.

Though the present invention is described using exemplary embodiments, various modifications and corrections may be proposed to a person of ordinary skill in the art. The present invention is intended to include modifications and corrections belonging to the appended claims.

The invention claimed is:

1. An apparatus for controlling a phased array antenna, the apparatus comprising:
the phased array antenna where a first sub array comprising a first plurality of antenna elements and a second sub array comprising a second plurality of antennas are disposed, configured to receive a signal through the first sub array and the second sub array; and
a controller configured to control a beam orientation of the phased array antenna based on a first channel value for the first sub array and a second channel value for the second sub array, which are estimated from the signal.

2. The apparatus of claim 1, wherein the controller comprises:
a reference channel response generator configured to generate a reference channel response based on the first channel value and the second channel value;
a direction error estimator configured to estimate an error for the beam orientation with respect to a direction in which the signal is transmitted based on the first channel value, the second channel value and the generated reference channel response; and
an orientation setting unit configured to adjust the beam orientation of the phased array antenna based on the estimated error.

3. The apparatus of claim 2, wherein the direction error estimator is configured to detect a phase error component of each of the first sub array and the second sub array based on a correlation between the first channel value and the second channel value, and the generated reference channel response, and estimate a phase error based on the detected phase error component of each of the first sub array and the second sub array; and
the orientation setting unit configured to adjust the beam orientation of the phased array antenna based on a direction error between the direction where the estimated phase error has been converted and an orientation setting direction at the phased array antenna.

4. The apparatus of claim 3, wherein the direction error estimator is configured to estimate the phase error using a least square method.

5. The apparatus of claim 1, further comprising a channel estimator configured to estimate the first channel value and the second channel value based on the signal by synthesizing a first outputs of the first plurality of antenna elements and a second outputs of the second plurality of antenna elements.

6. The apparatus of claim 1, further comprising:
a signal converter configured to synthesize first outputs of the first plurality of antenna elements and second outputs of the second plurality of antenna elements, and convert each of the first outputs and the second outputs to baseband signals; and
a signal processor configured to decode data of the signal based on the baseband signals.

7. The apparatus of claim 6, wherein the signal processor is configured to detect an error of the decoded data.

8. A method for controlling a phased array antenna, the method comprising:
receiving a signal through a first sub array and a second sub array, wherein the first sub array comprising a first plurality of antenna elements and the second sub array comprising a second plurality of antennas are disposed in the phased array antenna; and
controlling a beam orientation of the phased array antenna based on a first channel value for the first sub array and a second channel value for the second sub array which are estimated from the signal.

9. The method of claim 8, wherein controlling of the beam orientation of the phased array antenna comprises:
generating a reference channel response based on the first channel value and the second channel value;
estimating an error for the beam orientation with respect to a direction in which the signal is transmitted based on the first channel value, the second channel value and the generated reference channel response; and adjusting the beam orientation of the phased array antenna based on the estimated error.

10. The method of claim 9, wherein estimating of the error for the beam orientation comprises:
   detecting a phase error component of each of the first sub array and the second sub array based on a correlation between the first channel value and the second channel value, and the generated reference channel response, and
   estimate a phase error based on the detected phase error component of each of the first sub array and the second sub array; and
   adjusting the beam orientation of the phased array antenna based on a direction error between the direction where the estimated phase error has been converted and an orientation setting direction at the phased array antenna.

11. The method of claim 10, wherein the phase error is estimated using a least square method.

12. The method of claim 8, further comprising:
   estimating the first channel value and the second channel value based on the signal by synthesizing a first outputs of the first plurality of antenna elements and a second outputs of the second plurality of antenna elements.

13. The method of claim 8, further comprising:
   synthesizing first outputs of the first plurality of antenna elements and second outputs of the second plurality of antenna elements, and convert each of the first outputs and the second outputs to baseband signals; and
   decoding data of the signal based on the baseband signals.

14. The method of claim 13, further comprising detecting an error of the decoded data.

\* \* \* \* \*